United States Patent
Yu et al.

(10) Patent No.: US 11,563,543 B2
(45) Date of Patent: Jan. 24, 2023

(54) RESOURCE UNIT INDICATION METHOD AND APPARATUS, AND STORAGE MEDIUM

(71) Applicant: Huawei Technologies Co., Ltd., Shenzhen (CN)

(72) Inventors: Jian Yu, Shenzhen (CN); Ming Gan, Shenzhen (CN); Yunbo Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 7 days.

(21) Appl. No.: 17/157,072

(22) Filed: Jan. 25, 2021

(65) Prior Publication Data

US 2021/0143966 A1    May 13, 2021

Related U.S. Application Data

(63) Continuation of application No. PCT/CN2019/093178, filed on Jun. 27, 2019.

(30) Foreign Application Priority Data

Jul. 25, 2018 (CN) .......................... 201810830054.9

(51) Int. Cl.
    *H04L 5/00* (2006.01)
    *H04W 72/04* (2009.01)
    *H04W 88/08* (2009.01)

(52) U.S. Cl.
    CPC ....... *H04L 5/0053* (2013.01); *H04W 72/0453* (2013.01); *H04W 88/08* (2013.01)

(58) Field of Classification Search
    CPC ....... H04L 5/0053; H04L 1/08; H04L 1/0006; H04L 5/001; H04L 5/0092
    See application file for complete search history.

(56) References Cited

U.S. PATENT DOCUMENTS

2016/0295513 A1* 10/2016 Moon .................. H04B 7/0626
2018/0160429 A1*  6/2018 Seok ................. H04W 72/0453
(Continued)

FOREIGN PATENT DOCUMENTS

CN       106413093 A     2/2017
CN       106685618 A     5/2017
(Continued)

OTHER PUBLICATIONS

"IEEE P802.11ax/D2.3, Draft Standard for Information technology, Telecommunications and information exchange between systems Local and metropolitan area networks, Specific requirements, Part 11: Wireless LAN Medium Access Control (MAC) and Physical Layer (PHY) Specifications, Amendment 6: Enhancements for High Efficiency WLAN," Apr. 2018, 660 pages.
(Continued)

*Primary Examiner* — Ayaz R Sheikh
*Assistant Examiner* — Debebe A Asefa
(74) *Attorney, Agent, or Firm* — Conley Rose, P.C.

(57) ABSTRACT

A resource unit indication method and apparatus, and a storage medium, where the method includes: an access point (AP) sending a physical protocol data unit (PPDU) to a plurality of stations (STAs), where a transmission bandwidth of the PPDU is divided into M subblocks, M is an integer greater than 1, the transmission bandwidth is greater than or equal to 80 megahertz (MHz), the PPDU includes M first fields, the M first fields are in a one-to-one correspondence with the M subblocks, the first field is transmitted on a corresponding subblock, and the first field is used to indicate a resource unit (RU) allocated by the AP to at least one of the plurality of STAs.

20 Claims, 28 Drawing Sheets

(56) References Cited

U.S. PATENT DOCUMENTS

2018/0184429 A1  6/2018  Gan et al.
2018/0205520 A1  7/2018  Lin et al.
2019/0246399 A1  8/2019  Gan et al.

FOREIGN PATENT DOCUMENTS

| CN | 108200000 A | 6/2018 |
|---|---|---|
| JP | 2018532303 A | 11/2018 |
| KR | 20180018745 A | 2/2018 |
| WO | 2017036402 A1 | 3/2017 |

OTHER PUBLICATIONS

Yunoki, K., et al., "Considerations on HE-SIG-A/B. IEEE 802.11-15/827r2," Jul. 15, 2015, 14 pages.
IEEE Std 802.11, "IEEE Standard for Information technology, Telecommunications and information exchange between systems, Local and metropolitan area networks, Specific requirements. Part 11: Wireless LAN Medium Access Control (MAC) and Physical Layer (PHY) Specifications," 2016, 3534 pages.

\* cited by examiner

| | Resource unit allocation subfield of 1# 242-tone RU | Resource unit allocation subfield of 3# 242-tone RU | Center 26-tone RU indication | CRC+Tail | Per STA field in 1# and 3# 242-tone RUs |
|---|---|---|---|---|---|
| CC 1 | | | | | |

| | Resource unit allocation subfield of 2# 242-tone RU | Resource unit allocation subfield of 4# 242-tone RU | Center 26-tone RU indication | CRC+Tail | Per STA field in 2# and 4# 242-tone RUs |
|---|---|---|---|---|---|
| CC 2 | | | | | |

| | Resource unit allocation subfield of 1# 242-tone RU | Resource unit allocation subfield of 3# 242-tone RU | Center 26-tone RU indication | CRC+Tail | Per STA field in 1# and 3# 242-tone RUs |
|---|---|---|---|---|---|
| CC 1 | | | | | |

| | Resource unit allocation subfield of 2# 242-tone RU | Resource unit allocation subfield of 4# 242-tone RU | Center 26-tone RU indication | CRC+Tail | Per STA field in 2# and 4# 242-tone RUs |
|---|---|---|---|---|---|
| CC 2 | | | | | |

FIG. 3

| L-STF | L-LTF | L-SIG | RL-SIG | HE-SIG-A | HE-SIG-B | HE-STF | HE-LTF | Data | PE |
FIG. 4
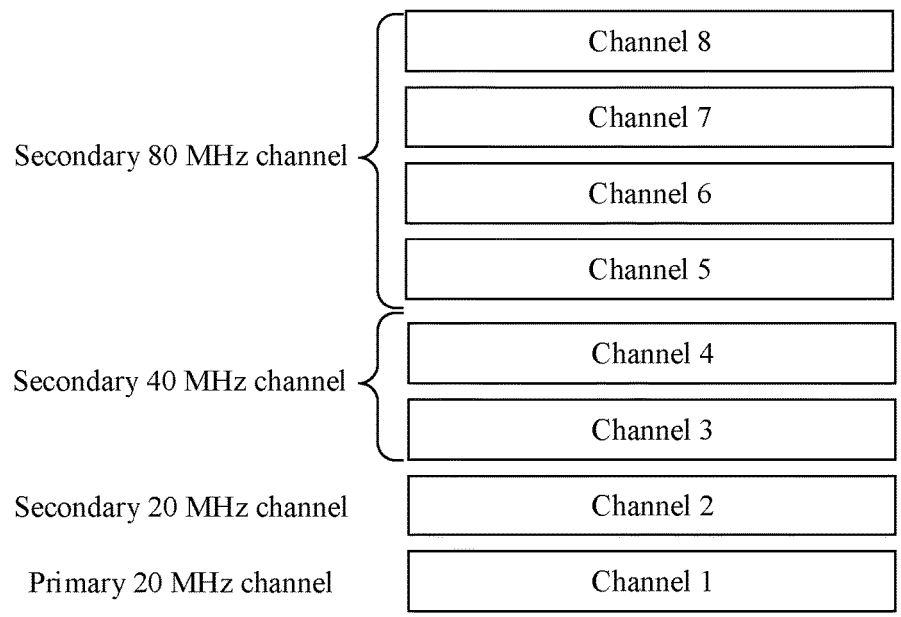
FIG. 5
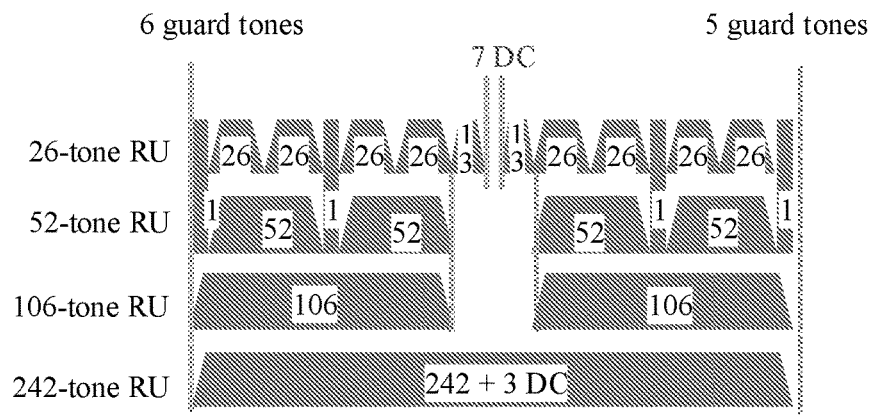
FIG. 6

| | | | | | | |
|---|---|---|---|---|---|---|
| CC 1 | Resource unit allocation subfield of 1# 242-tone RU | Resource unit allocation subfield of 3# 242-tone RU | Resource unit allocation subfield of 5# 242-tone RU | Resource unit allocation subfield of 7# 242-tone RU | CRC+ Tail | Per STA field in 1#, 3#, 5#, and 7# 242-tone RUs |
| CC 2 | Resource unit allocation subfield of 2# 242-tone RU | Resource unit allocation subfield of 4# 242-tone RU | Resource unit allocation subfield of 6# 242-tone RU | Resource unit allocation subfield of 8# 242-tone RU | CRC+ Tail | Per STA field in 2#, 4#, 6#, and 8# 242-tone RUs |
| CC 1 | Resource unit allocation subfield of 1# 242-tone RU | Resource unit allocation subfield of 3# 242-tone RU | Resource unit allocation subfield of 5# 242-tone RU | Resource unit allocation subfield of 7# 242-tone RU | CRC+ Tail | Per STA field in 1#, 3#, 5#, and 7# 242-tone RUs |
| CC 2 | Resource unit allocation subfield of 2# 242-tone RU | Resource unit allocation subfield of 4# 242-tone RU | Resource unit allocation subfield of 6# 242-tone RU | Resource unit allocation subfield of 8# 242-tone RU | CRC+ Tail | Per STA field in 2#, 4#, 6#, and 8# 242-tone RUs |
| CC 1 | Resource unit allocation subfield of 1# 242-tone RU | Resource unit allocation subfield of 3# 242-tone RU | Resource unit allocation subfield of 5# 242-tone RU | Resource unit allocation subfield of 7# 242-tone RU | CRC+ Tail | Per STA field in 1#, 3#, 5#, and 7# 242-tone RUs |
| CC 2 | Resource unit allocation subfield of 2# 242-tone RU | Resource unit allocation subfield of 4# 242-tone RU | Resource unit allocation subfield of 6# 242-tone RU | Resource unit allocation subfield of 8# 242-tone RU | CRC+ Tail | Per STA field in 2#, 4#, 6#, and 8# 242-tone RUs |
| CC 1 | Resource unit allocation subfield of 1# 242-tone RU | Resource unit allocation subfield of 3# 242-tone RU | Resource unit allocation subfield of 5# 242-tone RU | Resource unit allocation subfield of 7# 242-tone RU | CRC+ Tail | Per STA field in 1#, 3#, 5#, and 7# 242-tone RUs |
| CC 2 | Resource unit allocation subfield of 2# 242-tone RU | Resource unit allocation subfield of 4# 242-tone RU | Resource unit allocation subfield of 6# 242-tone RU | Resource unit allocation subfield of 8# 242-tone RU | CRC+ Tail | Per STA field in 2#, 4#, 6#, and 8# 242-tone RUs |

FIG. 10

| | | | | | |
|---|---|---|---|---|---|
| CC 11 | Resource unit allocation subfield of 1# 242-tone RU | Resource unit allocation subfield of 3# 242-tone RU | Center 26-tone RU indication | CRC+ Tail | Per STA field in 1# and 3# 242-tone RUs |
| CC 12 | Resource unit allocation subfield of 2# 242-tone RU | Resource unit allocation subfield of 4# 242-tone RU | Center 26-tone RU indication | CRC+ Tail | Per STA field in 2# and 4# 242-tone RUs |
| CC 11 | Resource unit allocation subfield of 1# 242-tone RU | Resource unit allocation subfield of 3# 242-tone RU | Center 26-tone RU indication | CRC+ Tail | Per STA field in 1# and 3# 242-tone RUs |
| CC 12 | Resource unit allocation subfield of 2# 242-tone RU | Resource unit allocation subfield of 4# 242-tone RU | Center 26-tone RU indication | CRC+ Tail | Per STA field in 2# and 4# 242-tone RUs |
| CC 21 | Resource unit allocation subfield of 5# 242-tone RU | Resource unit allocation subfield of 7# 242-tone RU | Center 26-tone RU indication | CRC+ Tail | Per STA field in 5# and 7# 242-tone RUs |
| CC 22 | Resource unit allocation subfield of 6# 242-tone RU | Resource unit allocation subfield of 8# 242-tone RU | Center 26-tone RU indication | CRC+ Tail | Per STA field in 6# and 8# 242-tone RUs |
| CC 21 | Resource unit allocation subfield of 5# 242-tone RU | Resource unit allocation subfield of 7# 242-tone RU | Center 26-tone RU indication | CRC+ Tail | Per STA field in 5# and 7# 242-tone RUs |
| CC 22 | Resource unit allocation subfield of 6# 242-tone RU | Resource unit allocation subfield of 8# 242-tone RU | Center 26-tone RU indication | CRC+ Tail | Per STA field in 6# and 8# 242-tone RUs |
| CC 31 | Resource unit allocation subfield of 9# 242-tone RU | Resource unit allocation subfield of 11# 242-tone RU | Center 26-tone RU indication | CRC+ Tail | Per STA field in 9# and 11# 242-tone RUs |
| CC 32 | Resource unit allocation subfield of 10# 242-tone RU | Resource unit allocation subfield of 12# 242-tone RU | Center 26-tone RU indication | CRC+ Tail | Per STA field in 10# and 12# 242-tone RUs |
| CC 31 | Resource unit allocation subfield of 9# 242-tone RU | Resource unit allocation subfield of 11# 242-tone RU | Center 26-tone RU indication | CRC+ Tail | Per STA field in 9# and 11# 242-tone RUs |
| CC 32 | Resource unit allocation subfield of 10# 242-tone RU | Resource unit allocation subfield of 12# 242-tone RU | Center 26-tone RU indication | CRC+ Tail | Per STA field in 10# and 12# 242-tone RUs |
| CC 41 | Resource unit allocation subfield of 13# 242-tone RU | Resource unit allocation subfield of 15# 242-tone RU | Center 26-tone RU indication | CRC+ Tail | Per STA field in 13# and 15# 242-tone RUs |
| CC 42 | Resource unit allocation subfield of 14# 242-tone RU | Resource unit allocation subfield of 16# 242-tone RU | Center 26-tone RU indication | CRC+ Tail | Per STA field in 14# and 16# 242-tone RUs |
| CC 41 | Resource unit allocation subfield of 13# 242-tone RU | Resource unit allocation subfield of 15# 242-tone RU | Center 26-tone RU indication | CRC+ Tail | Per STA field in 13# and 15# 242-tone RUs |
| CC 42 | Resource unit allocation subfield of 14# 242-tone RU | Resource unit allocation subfield of 16# 242-tone RU | Center 26-tone RU indication | CRC+ Tail | Per STA field in 14# and 16# 242-tone RUs |

FIG. 14

| | | | | |
|---|---|---|---|---|
| CC 11 | Resource unit allocation subfield of 1# 242-tone RU | Center 26-tone RU indication | CRC+Tail | Per STA field in 1# 242-tone RU |
| CC 12 | Resource unit allocation subfield of 2# 242-tone RU | Center 26-tone RU indication | CRC+Tail | Per STA field in 2# 242-tone RU |
| CC 13 | Resource unit allocation subfield of 3# 242-tone RU | Center 26-tone RU indication | CRC+Tail | Per STA field in 3# 242-tone RU |
| CC 14 | Resource unit allocation subfield of 4# 242-tone RU | Center 26-tone RU indication | CRC+Tail | Per STA field in 4# 242-tone RU |
| CC 21 | Resource unit allocation subfield of 5# 242-tone RU | Center 26-tone RU indication | CRC+Tail | Per STA field in 5# 242-tone RU |
| CC 22 | Resource unit allocation subfield of 6# 242-tone RU | Center 26-tone RU indication | CRC+Tail | Per STA field in 6# 242-tone RU |
| CC 23 | Resource unit allocation subfield of 7# 242-tone RU | Center 26-tone RU indication | CRC+Tail | Per STA field in 7# 242-tone RU |
| CC 24 | Resource unit allocation subfield of 8# 242-tone RU | Center 26-tone RU indication | CRC+Tail | Per STA field in 8# 242-tone RU |
| CC 31 | Resource unit allocation subfield of 9# 242-tone RU | Center 26-tone RU indication | CRC+Tail | Per STA field in 9# 242-tone RU |
| CC 32 | Resource unit allocation subfield of 10# 242-tone RU | Center 26-tone RU indication | CRC+Tail | Per STA field in 10# and 12# 242-tone RUs |
| CC 33 | Resource unit allocation subfield of 11# 242-tone RU | Center 26-tone RU indication | CRC+Tail | Per STA field in 11# 242-tone RU |
| CC 34 | Resource unit allocation subfield of 12# 242-tone RU | Center 26-tone RU indication | CRC+Tail | Per STA field in 12# 242-tone RU |
| CC 41 | Resource unit allocation subfield of 13# 242-tone RU | Center 26-tone RU indication | CRC+Tail | Per STA field in 13# 242-tone RU |
| CC 42 | Resource unit allocation subfield of 14# 242-tone RU | Center 26-tone RU indication | CRC+Tail | Per STA field in 14# 242-tone RU |
| CC 43 | Resource unit allocation subfield of 15# 242-tone RU | Center 26-tone RU indication | CRC+Tail | Per STA field in 15# 242-tone RU |
| CC 44 | Resource unit allocation subfield of 16# 242-tone RU | Center 26-tone RU indication | CRC+Tail | Per STA field in 16# 242-tone RU |

FIG. 15

| CC 11 | Resource unit allocation subfield | Indication information | CRC+Tail | Per STA field |
|---|---|---|---|---|
| CC 12 | Resource unit allocation subfield | Indication information | CRC+Tail | Per STA field |

FIG. 17

| | | | | | | | |
|---|---|---|---|---|---|---|---|
| CC 11 | Resource unit allocation subfield of 1# 242-tone RU | Resource unit allocation subfield of 3# 242-tone RU | Resource unit allocation subfield of 5# 242-tone RU | Resource unit allocation subfield of 7# 242-tone RU | Center 26-tone RU indication | CRC+ Tail | Per STA field in 1#, 3#, 5#, and 7# 242-tone RUs |
| CC 12 | Resource unit allocation subfield of 2# 242-tone RU | Resource unit allocation subfield of 4# 242-tone RU | Resource unit allocation subfield of 6# 242-tone RU | Resource unit allocation subfield of 8# 242-tone RU | Center 26-tone RU indication | CRC+ Tail | Per STA field in 2#, 4#, 6#, and 8# 242-tone RUs |
| CC 11 | Resource unit allocation subfield of 1# 242-tone RU | Resource unit allocation subfield of 3# 242-tone RU | Resource unit allocation subfield of 5# 242-tone RU | Resource unit allocation subfield of 7# 242-tone RU | Center 26-tone RU indication | CRC+ Tail | Per STA field in 1#, 3#, 5#, and 7# 242-tone RUs |
| CC 12 | Resource unit allocation subfield of 2# 242-tone RU | Resource unit allocation subfield of 4# 242-tone RU | Resource unit allocation subfield of 6# 242-tone RU | Resource unit allocation subfield of 8# 242-tone RU | Center 26-tone RU indication | CRC+ Tail | Per STA field in 2#, 4#, 6#, and 8# 242-tone RUs |
| CC 11 | Resource unit allocation subfield of 1# 242-tone RU | Resource unit allocation subfield of 3# 242-tone RU | Resource unit allocation subfield of 5# 242-tone RU | Resource unit allocation subfield of 7# 242-tone RU | Center 26-tone RU indication | CRC+ Tail | Per STA field in 1#, 3#, 5#, and 7# 242-tone RUs |
| CC 12 | Resource unit allocation subfield of 2# 242-tone RU | Resource unit allocation subfield of 4# 242-tone RU | Resource unit allocation subfield of 6# 242-tone RU | Resource unit allocation subfield of 8# 242-tone RU | Center 26-tone RU indication | CRC+ Tail | Per STA field in 2#, 4#, 6#, and 8# 242-tone RUs |

CONT.
FROM
FIG. 19A

| | | | | | | | |
|---|---|---|---|---|---|---|---|
| CC 11 | Resource unit allocation subfield of 1# 242-tone RU | Resource unit allocation subfield of 3# 242-tone RU | Resource unit allocation subfield of 5# 242-tone RU | Resource unit allocation subfield of 7# 242-tone RU | Center 26-tone RU indication | CRC+ Tail | Per STA field in 1#, 3#, 5#, and 7# 242-tone RUs |
| CC 12 | Resource unit allocation subfield of 2# 242-tone RU | Resource unit allocation subfield of 4# 242-tone RU | Resource unit allocation subfield of 6# 242-tone RU | Resource unit allocation subfield of 8# 242-tone RU | Center 26-tone RU indication | CRC+ Tail | Per STA field in 2#, 4#, 6#, and 8# 242-tone RUs |
| CC 21 | Resource unit allocation subfield of 9# 242-tone RU | Resource unit allocation subfield of 11# 242-tone RU | Resource unit allocation subfield of 13# 242-tone RU | Resource unit allocation subfield of 15# 242-tone RU | Center 26-tone RU indication | CRC+ Tail | Per STA field in 9#, 11#, 13#, and 15# 242-tone RUs |
| CC 22 | Resource unit allocation subfield of 10# 242-tone RU | Resource unit allocation subfield of 12# 242-tone RU | Resource unit allocation subfield of 14# 242-tone RU | Resource unit allocation subfield of 16# 242-tone RU | Center 26-tone RU indication | CRC+ Tail | Per STA field in 10#, 12#, 14#, and 16# 242-tone RUs |

CONT. FROM FIG. 19B

| | | | | | | | |
|---|---|---|---|---|---|---|---|
| CC 21 | Resource unit allocation subfield of 9# 242-tone RU | Resource unit allocation subfield of 11# 242-tone RU | Resource unit allocation subfield of 13# 242-tone RU | Resource unit allocation subfield of 15# 242-tone RU | Center 26-tone RU indication | CRC+ Tail | Per STA field in 9#, 11#, 13#, and 15# 242-tone RUs |
| CC 22 | Resource unit allocation subfield of 10# 242-tone RU | Resource unit allocation subfield of 12# 242-tone RU | Resource unit allocation subfield of 14# 242-tone RU | Resource unit allocation subfield of 16# 242-tone RU | Center 26-tone RU indication | CRC+ Tail | Per STA field in 10#, 12#, 14#, and 16# 242-tone RUs |
| CC 21 | Resource unit allocation subfield of 9# 242-tone RU | Resource unit allocation subfield of 11# 242-tone RU | Resource unit allocation subfield of 13# 242-tone RU | Resource unit allocation subfield of 15# 242-tone RU | Center 26-tone RU indication | CRC+ Tail | Per STA field in 9#, 11#, 13#, and 15# 242-tone RUs |
| CC 22 | Resource unit allocation subfield of 10# 242-tone RU | Resource unit allocation subfield of 12# 242-tone RU | Resource unit allocation subfield of 14# 242-tone RU | Resource unit allocation subfield of 16# 242-tone RU | Center 26-tone RU indication | CRC+ Tail | Per STA field in 10#, 12#, 14#, and 16# 242-tone RUs |
| CC 21 | Resource unit allocation subfield of 9# 242-tone RU | Resource unit allocation subfield of 11# 242-tone RU | Resource unit allocation subfield of 13# 242-tone RU | Resource unit allocation subfield of 15# 242-tone RU | Center 26-tone RU indication | CRC+ Tail | Per STA field in 9#, 11#, 13#, and 15# 242-tone RUs |
| CC 22 | Resource unit allocation subfield of 10# 242-tone RU | Resource unit allocation subfield of 12# 242-tone RU | Resource unit allocation subfield of 14# 242-tone RU | Resource unit allocation subfield of 16# 242-tone RU | Center 26-tone RU indication | CRC+ Tail | Per STA field in 10#, 12#, 14#, and 16# 242-tone RUs |

FIG. 19C

| | | | | | |
|---|---|---|---|---|---|
| CC 11 | Resource unit allocation subfield of 1# 242-tone RU | Resource unit allocation subfield of 5# 242-tone RU | Center 26-tone RU indication | CRC+ Tail | Per STA field in 1# and 5# 242-tone RUs |
| CC 12 | Resource unit allocation subfield of 2# 242-tone RU | Resource unit allocation subfield of 6# 242-tone RU | Center 26-tone RU indication | CRC+ Tail | Per STA field in 2# and 6# 242-tone RUs |
| CC 13 | Resource unit allocation subfield of 3# 242-tone RU | Resource unit allocation subfield of 7# 242-tone RU | Center 26-tone RU indication | CRC+ Tail | Per STA field in 3# and 7# 242-tone RUs |
| CC 14 | Resource unit allocation subfield of 4# 242-tone RU | Resource unit allocation subfield of 8# 242-tone RU | Center 26-tone RU indication | CRC+ Tail | Per STA field in 4# and 8# 242-tone RUs |
| CC 11 | Resource unit allocation subfield of 1# 242-tone RU | Resource unit allocation subfield of 5# 242-tone RU | Center 26-tone RU indication | CRC+ Tail | Per STA field in 1# and 5# 242-tone RUs |
| CC 12 | Resource unit allocation subfield of 2# 242-tone RU | Resource unit allocation subfield of 6# 242-tone RU | Center 26-tone RU indication | CRC+ Tail | Per STA field in 2# and 6# 242-tone RUs |
| CC 13 | Resource unit allocation subfield of 3# 242-tone RU | Resource unit allocation subfield of 7# 242-tone RU | Center 26-tone RU indication | CRC+ Tail | Per STA field in 3# and 7# 242-tone RUs |
| CC 14 | Resource unit allocation subfield of 4# 242-tone RU | Resource unit allocation subfield of 8# 242-tone RU | Center 26-tone RU indication | CRC+ Tail | Per STA field in 4# and 8# 242-tone RUs |

CONT. FROM FIG. 20A

| | Resource unit allocation subfield of 9# 242-tone RU | Resource unit allocation subfield of 13# 242-tone RU | Center 26-tone RU indication | CRC+ Tail | Per STA field in 9# and 13# 242-tone RUs |
|---|---|---|---|---|---|
| CC 21 | Resource unit allocation subfield of 9# 242-tone RU | Resource unit allocation subfield of 13# 242-tone RU | Center 26-tone RU indication | CRC+ Tail | Per STA field in 9# and 13# 242-tone RUs |
| CC 22 | Resource unit allocation subfield of 10# 242-tone RU | Resource unit allocation subfield of 14# 242-tone RU | Center 26-tone RU indication | CRC+ Tail | Per STA field in 10# and 14# 242-tone RUs |
| CC 23 | Resource unit allocation subfield of 11# 242-tone RU | Resource unit allocation subfield of 15# 242-tone RU | Center 26-tone RU indication | CRC+ Tail | Per STA field in 11# and 15# 242-tone RUs |
| CC 24 | Resource unit allocation subfield of 12# 242-tone RU | Resource unit allocation subfield of 16# 242-tone RU | Center 26-tone RU indication | CRC+ Tail | Per STA field in 12# and 16# 242-tone RUs |
| CC 21 | Resource unit allocation subfield of 9# 242-tone RU | Resource unit allocation subfield of 13# 242-tone RU | Center 26-tone RU indication | CRC+ Tail | Per STA field in 9# and 13# 242-tone RUs |
| CC 22 | Resource unit allocation subfield of 10# 242-tone RU | Resource unit allocation subfield of 14# 242-tone RU | Center 26-tone RU indication | CRC+ Tail | Per STA field in 10# and 14# 242-tone RUs |
| CC 23 | Resource unit allocation subfield of 11# 242-tone RU | Resource unit allocation subfield of 15# 242-tone RU | Center 26-tone RU indication | CRC+ Tail | Per STA field in 11# and 15# 242-tone RUs |
| CC 24 | Resource unit allocation subfield of 12# 242-tone RU | Resource unit allocation subfield of 16# 242-tone RU | Center 26-tone RU indication | CRC+ Tail | Per STA field in 12# and 16# 242-tone RUs |

FIG. 20B

| | Resource unit subfield indicating a segment combination Seg 1 + Seg 2 | Resource unit subfield indicating a segment combination Seg 1 + Seg 2 | Resource unit subfield indicating a segment combination Seg 1 + Seg 2 | Center 26-tone RU indication | Indication information | CRC+ Tail | Per STA field |
|---|---|---|---|---|---|---|---|
| CC 11 | | | | | | | |
| CC 12 | Resource unit subfield indicating a segment combination Seg 1 + Seg 2 | Resource unit subfield indicating a segment combination Seg 1 + Seg 2 | Resource unit subfield indicating a segment combination Seg 1 + Seg 2 | Center 26-tone RU indication | Indication information | CRC+ Tail | Per STA field |

FIG. 21

| CC 11 | Resource unit allocation subfield | Indication information | CRC+Tail | Per STA field |

| CC 12 | Resource unit allocation subfield | Indication information | CRC+Tail | Per STA field |

FIG. 22

| Trigger frame in a subblock 1 | Common field | Per STA field | ... | Per STA field |
|---|---|---|---|---|
| Trigger frame in a subblock 2 | Common field | Per STA field | ... | Per STA field |
| Trigger frame in a subblock 3 | Common field | Per STA field | ... | Per STA field |
| Trigger frame in a subblock 4 | Common field | Per STA field | ... | Per STA field |

FIG. 25

RESOURCE UNIT INDICATION METHOD AND APPARATUS, AND STORAGE MEDIUM

CROSS-REFERENCE TO RELATED APPLICATIONS

This application is a continuation of International Patent Application No. PCT/CN2019/093178, filed on Jun. 27, 2019, which claims priority to Chinese Patent Application No. 201810830054.9, filed on Jul. 25, 2018. The disclosures of the aforementioned applications are hereby incorporated by reference in their entireties.

TECHNICAL FIELD

This application relates to the field of communications technologies, and in particular, to a resource unit indication method and apparatus, and a storage medium.

BACKGROUND

Currently, 802.1ax has provided resource unit (RU) indication methods of downlink (DL) orthogonal frequency-division multiple access (OFDMA) and DL multiple user (MU) multiple input multiple output (MIMO). A transmit end sends a physical protocol data unit (PPDU). The PPDU includes a high efficient-signal A (HE-SIG-A) field and a high efficient-signal B (HE-SIG-B) field. HE-SIG-A is used to indicate a symbol length of HE-SIG-B, a modulation and coding scheme (MCS) of HE-SIG-B, a bandwidth of the entire PPDU, and the like. If the bandwidth of the PPDU is greater than 20 megahertz (MHz), HE-SIG-A is duplicated in each 20 MHz and then transmitted. The PPDU further includes HE-SIG-B that provides resource indication information of DL MU MIMO and DL OFDMA. First, HE-SIG-B is separately coded in each 20 MHz. A coding structure of HE-SIG-B in each 20 MHz is shown in FIG. 1. FIG. 1 is a schematic diagram of a coding structure of HE-SIG-B in each 20 MHz according to an embodiment of this application. Entire HE-SIG-B is divided into two parts: a common field and a per station (STA) field. The common field includes 1 to N resource unit allocation subfields, a center 26-tone resource unit indication field that exists when a bandwidth is greater than or equal to 80 MHz, a cyclic redundancy code (CRC) subfield used for check, and a tail subfield used for cyclic decoding. In addition, the per STA field has 1 to M STA fields in a resource unit allocation order. Each two of the M STA fields are usually one group and each two STA fields are followed by one CRC field and one tail field, except that the last group may have one or two STA fields.

An indication manner of the resource unit allocation subfield depends on tone plans in different PPDU bandwidths in 802.11ax. For example, FIG. 2 is a schematic diagram of a tone plan and an RU plan of 80 MHz according to an embodiment of this application. As shown in FIG. 2, when a bandwidth is 80 MHz, the entire bandwidth includes four resource units in a unit of 242-tone RU. In particular, a center 26-tone RU including two 13-tone subunits further exists in the center of the entire bandwidth. Alternatively, the entire bandwidth may include one entire 996-tone RU, or may include various combinations of 26-tone RUs, 52-tone RUs, 106-tone RUs, 242-tone RUs, and 484-tone RUs. Further, in the unit of 242-tone RU, a leftmost side of FIG. 2 may be considered as a lowest frequency, and a rightmost side of FIG. 2 may be considered as a first highest frequency. From left to right, RUs within a 242-tone RU range may be numbered.

Further, 802.11ax introduces the concept of a content channel (CC). FIG. 3 is a schematic diagram of an HE-SIG-B indication in a PPDU bandwidth of 80 MHz according to an embodiment of this application. As shown in FIG. 3, when the PPDU bandwidth is 80 MHz, there are two CCs and there are four channels in total, and therefore resource unit allocation information is overall indicated on the four channels based on a structure of CC1, CC2, CC1, and CC2 in ascending order of frequencies. CC1 includes resource unit allocation subfields within ranges of the first and the third 242-tone RUs and a corresponding per STA field within the ranges. CC2 includes resource unit subfields within ranges of the second and the fourth 242-tone RUs and a corresponding per STA field within the ranges. In addition, a center 26-tone RU indication of 80 MHz is carried on each of the two CCs, to indicate whether the resource unit is used to transmit data.

In summary, in other approaches, resource unit indication in cases of 20 MHz to 160 MHz is implemented, but this results in relatively large overheads. For example, when a PPDU bandwidth is 80 MHz, each CC includes two resource unit allocation indication subfields, and includes a per STA field of all users in two 242-tone RUs, and consequently overheads are relatively large. When a PPDU bandwidth of 320 MHz is considered in a next-generation standard, overheads are further multiplied. Therefore, how a new PPDU in the next-generation standard of 802.11ax supports OFDMA or MU-MIMO transmission in a larger bandwidth (for example, 320 MHz) at fewer overheads is a problem that needs to be considered in this application.

SUMMARY

This application provides a resource unit indication method and apparatus, and a storage medium, to support data transmission in a larger bandwidth at fewer overheads.

According to a first aspect, this application provides a resource unit indication method, including: an access point (AP) sends a physical protocol data unit (PPDU) to a plurality of stations (STAs), where a transmission bandwidth of the PPDU is divided into M subblocks, M is an integer greater than 1, the transmission bandwidth is greater than or equal to 80 MHz, the PPDU includes M first fields, the M first fields are in a one-to-one correspondence with the M subblocks, the first field is transmitted on a corresponding subblock, and the first field is used to indicate an RU allocated by the AP to at least one of the plurality of STAs.

According to a second aspect, this application provides a resource unit indication method, including: a STA receives a PPDU sent by an AP, where a transmission bandwidth of the PPDU is divided into M subblocks, M is an integer greater than 1, the transmission bandwidth is greater than or equal to 80 MHz, the PPDU includes M first fields, the M first fields are in a one-to-one correspondence with the M subblocks, the first field is transmitted on a corresponding subblock, the first field is used to indicate an RU allocated by the AP to at least one of a plurality of STAs, and the STA is any of the plurality of STAs; and the STA transmits uplink data based on the first field.

This application includes the following beneficial effect: According to the resource unit indication method provided in the first aspect or the second aspect, data transmission in a larger bandwidth is supported at fewer overheads.

Optionally, when the RU is greater than a maximum RU included in the subblock corresponding to the first field, the RU is a subblock combination including a plurality of subblocks, or the RU is a segment combination including all or some segments included in a plurality of subblocks. In other words, this application implements a subblock combination or segment combination indication method.

In a possible implementation, the PPDU further includes indication information, and the indication information is used to indicate a quantity of STAs that transmit data in the RU.

Optionally, when the transmission bandwidth is 320 MHz and M=4, the RU is a subblock combination, and correspondingly, a correspondence between the first field and the subblock combination is any of the following: When the first field is a first value, the subblock combination is a combination of a first subblock and a second subblock. When the first field is a second value, the subblock combination is a combination of the first subblock and a third subblock. When the first field is a third value, the subblock combination is a combination of the first subblock and a fourth subblock. When the first field is a fourth value, the subblock combination is a combination of the second subblock and the third subblock. When the first field is a fifth value, the subblock combination is a combination of the second subblock and the fourth subblock. When the first field is a sixth value, the subblock combination is a combination of the third subblock and the fourth subblock. When the first field is a seventh value, the subblock combination is a combination of the first subblock, the second subblock, and the third subblock. When the first field is an eighth value, the subblock combination is a combination of the first subblock, the second subblock, and the fourth subblock. When the first field is a ninth value, the subblock combination is a combination of the first subblock, the third subblock, and the fourth subblock. When the first field is a tenth value, the subblock combination is a combination of the second subblock, the third subblock, and the fourth subblock. When the first field is an eleventh value, the subblock combination is a combination of the first subblock, the second subblock, the third subblock, and the fourth subblock. The first subblock, the second subblock, the third subblock, and the fourth subblock are four different subblocks.

Optionally, a length of the first field is 8 bits.

Optionally, when the transmission bandwidth is 320 MHz and M=2, the RU is a segment combination, and correspondingly, a correspondence between the first field and the segment combination is any of the following: When the first field is a first value, the segment combination is a combination of a first segment, a second segment, and a third segment. When the first field is a second value, the segment combination is a combination of the first segment, the second segment, and a fourth segment. When the first field is a third value, the segment combination is a combination of the first segment, the third segment, and the fourth segment. When the first field is a fourth value, the segment combination is a combination of the second segment, the third segment, and the fourth segment. When the first field is a fifth value, the segment combination is a combination of the first segment, the second segment, the third segment, and the fourth segment. The first segment and the second segment constitute one of the M subblocks, and the third segment and the fourth segment constitute the other one of the M subblocks.

Optionally, a length of the first field is 8 bits.

In another possible implementation, the first field is further used to indicate a quantity of STAs that transmit data in the RU.

Optionally, when the transmission bandwidth is 320 MHz and M=4, the RU is a subblock combination, and correspondingly, a correspondence between the first field and the subblock combination and the quantity of STAs that transmit data using the subblock combination includes at least one of the following: When the first field is a first value, the subblock combination is a combination of a first subblock and a second subblock, and the quantity of STAs that transmit data using the subblock combination is a first quantity. When the first field is a second value, the subblock combination is a combination of the first subblock and a third subblock, and the quantity of STAs that transmit data using the subblock combination is a second quantity. When the first field is a third value, the subblock combination is a combination of the first subblock and a fourth subblock, and the quantity of STAs that transmit data using the subblock combination is a third quantity. When the first field is a fourth value, the subblock combination is a combination of the second subblock and the third subblock, and the quantity of STAs that transmit data using the subblock combination is a fourth quantity. When the first field is a fifth value, the subblock combination is a combination of the second subblock and the fourth subblock, and the quantity of STAs that transmit data using the subblock combination is a fifth quantity. When the first field is a sixth value, the subblock combination is a combination of the third subblock and the fourth subblock, and the quantity of STAs that transmit data using the subblock combination is a sixth quantity. When the first field is a seventh value, the subblock combination is a combination of the first subblock, the second subblock, and the third subblock, and the quantity of STAs that transmit data using the subblock combination is a seventh quantity. When the first field is an eighth value, the subblock combination is a combination of the first subblock, the second subblock, and the fourth subblock, and the quantity of STAs that transmit data using the subblock combination is an eighth quantity. When the first field is a ninth value, the subblock combination is a combination of the first subblock, the third subblock, and the fourth subblock, and the quantity of STAs that transmit data using the subblock combination is a ninth quantity. When the first field is a tenth value, the subblock combination is a combination of the second subblock, the third subblock, and the fourth subblock, and the quantity of STAs that transmit data using the subblock combination is a tenth quantity. When the first field is an eleventh value, the subblock combination is a combination of the first subblock, the second subblock, the third subblock, and the fourth subblock, and the quantity of STAs that transmit data using the subblock combination is an eleventh quantity. The first subblock, the second subblock, the third subblock, and the fourth subblock are four different subblocks in the M subblocks.

Optionally, a length of the first field is 9 bits.

Optionally, when the transmission bandwidth is 320 MHz and M=2, the RU is a segment combination, and correspondingly, a correspondence between the first field and the segment combination and the quantity of STAs that transmit data using the segment combination includes at least one of the following: When the first field is a first value, the segment combination is a combination of a first segment, a second segment, and a third segment, and the quantity of STAs that transmit data using the segment combination is a first quantity. When the first field is a second value, the segment combination is a combination of the first segment, the second segment, and a fourth segment, and the quantity of STAs that transmit data using the segment combination is a second quantity. When the first field is a third value, the segment combination is a combination of the first segment, the third segment, and the fourth segment, and the quantity of STAs that transmit data using the segment combination is a third quantity. When the first field is a fourth value, the segment combination is a combination of the second segment, the third segment, and the fourth segment, and the quantity of STAs that transmit data using the segment combination is a fourth quantity. When the first field is a fifth value, the segment combination is a combination of the first segment, the second segment, the third segment, and the fourth segment, and the quantity of STAs that transmit data using the segment combination is a fifth quantity. The first segment and the second segment constitute one of the M subblocks, and the third segment and the fourth segment constitute the other one of the M subblocks.

Optionally, each of the first fields is 9 bits.

Optionally, the RU includes the subblock corresponding to the first field, such that resource overheads are further reduced.

Optionally, the PPDU further includes M second fields, the M second fields are in a one-to-one correspondence with the M first fields, and the second field includes at least one piece of the following information: a symbol quantity of a first field corresponding to the second field, a modulation and coding scheme (MCS) of the first field corresponding to the second field, a compressed mode of the first field corresponding to the second field, the transmission bandwidth of the PPDU, a basic service set color, a guard interval and long training sequence size.

Optionally, the PPDU includes N physical protocol data subunits, and N is less than or equal to M, such that data transmission flexibility is improved.

According to a third aspect, this application provides a resource unit indication method, including: an AP sends a PPDU to a plurality of STAs, where the PPDU includes M trigger frames, and M is an integer greater than 1, where a transmission bandwidth of the PPDU is divided into M subblocks, the transmission bandwidth is greater than or equal to 40 MHz, the M trigger frames are in a one-to-one correspondence with the M subblocks, the trigger frame includes a first field, the first field is transmitted on a subblock corresponding to the trigger frame, and the first field is used to indicate an RU allocated by the AP to at least one of the plurality of STAs.

According to a fourth aspect, this application provides a resource unit indication method, including: a STA receives a PPDU sent by an AP, where the PPDU includes M trigger frames, and M is an integer greater than 1, where a transmission bandwidth of the PPDU is divided into M subblocks, the transmission bandwidth is greater than or equal to 40 MHz, the M trigger frames are in a one-to-one correspondence with the M subblocks, the trigger frame includes a first field, the first field is transmitted on a subblock corresponding to the trigger frame, the first field is used to indicate an RU allocated by the AP to at least one of a plurality of STAs, and the STA is any of the plurality of STAs; and the STA transmits uplink data based on the first field.

Optionally, when the RU is greater than a maximum RU included in the subblock corresponding to the first field, the RU is a subblock combination including a plurality of subblocks, or the RU is a segment combination including all or some segments included in a plurality of subblocks.

Optionally, when the transmission bandwidth is 320 MHz and M=4, the RU is a subblock combination, and correspondingly, a correspondence between the first field and the subblock combination is any of the following: When the first field is a first value, the subblock combination is a combination of a first subblock and a second subblock. When the first field is a second value, the subblock combination is a combination of the first subblock and a third subblock. When the first field is a third value, the subblock combination is a combination of the first subblock and a fourth subblock. When the first field is a fourth value, the subblock combination is a combination of the second subblock and the third subblock. When the first field is a fifth value, the subblock combination is a combination of the second subblock and the fourth subblock. When the first field is a sixth value, the subblock combination is a combination of the third subblock and the fourth subblock. When the first field is a seventh value, the subblock combination is a combination of the first subblock, the second subblock, and the third subblock. When the first field is an eighth value, the subblock combination is a combination of the first subblock, the second subblock, and the fourth subblock. When the first field is a ninth value, the subblock combination is a combination of the first subblock, the third subblock, and the fourth subblock. When the first field is a tenth value, the subblock combination is a combination of the second subblock, the third subblock, and the fourth subblock. When the first field is an eleventh value, the subblock combination is a combination of the first subblock, the second subblock, the third subblock, and the fourth subblock. The first subblock, the second subblock, the third subblock, and the fourth subblock are four different subblocks in the M subblocks.

Optionally, a length of the first field is 8 bits.

Optionally, when the transmission bandwidth is 320 MHz and M=2, the RU is a segment combination, and correspondingly, a correspondence between the first field and the segment combination includes at least one of the following: When the first field is a first value, the segment combination is a combination of a first segment, a second segment, and a third segment. When the first field is a second value, the segment combination is a combination of the first segment, the second segment, and a fourth segment. When the first field is a third value, the segment combination is a combination of the first segment, the third segment, and the fourth segment. When the first field is a fourth value, the segment combination is a combination of the second segment, the third segment, and the fourth segment. When the first field is a fifth value, the segment combination is a combination of the first segment, the second segment, the third segment, and the fourth segment. The first segment and the second segment constitute one of the M subblocks, and the third segment and the fourth segment constitute the other one of the M subblocks.

Optionally, the first field is 8 bits.

Optionally, when the transmission bandwidth is divided into M subblocks in a unit of 160 MHz, the trigger frame further includes a second field. When the second field is a first value and the RU is less than or equal to a 996-tone RU, the first value is used to indicate that the RU belongs to primary 80 MHz in the subblock corresponding to the trigger frame, or when the second field is a second value and the RU is less than or equal to a 996-tone RU, the second value is used to indicate that the RU belongs to secondary 80 MHz in the subblock corresponding to the trigger frame; or when the second field is a first value and the RU is less than or equal to a 996-tone RU, the first value is used to indicate that the RU belongs to a low frequency 80 MHz in the subblock corresponding to the trigger frame, or when the second field is a second value and the RU is less than or equal to a 996-tone RU, the second value is used to indicate that the RU belongs to a high frequency 80 MHz in the subblock corresponding to the trigger frame.

Optionally, when the transmission bandwidth is 320 MHz, the trigger frame further includes a third field. When the third field is a first value and the RU is less than or equal to a 996-tone RU, the first value is used to indicate that the RU belongs to a first lowest frequency 80 MHz in the transmission bandwidth, or when the third field is a second value and the RU is less than or equal to a 996-tone RU, the second value is used to indicate that the RU belongs to a second lowest frequency 80 MHz in the transmission bandwidth, or when the third field is a third value and the RU is less than or equal to a 996-tone RU, the third value is used to indicate that the RU belongs to a second highest frequency 80 MHz in the transmission bandwidth, or when the third field is a fourth value and the RU is less than or equal to a 996-tone RU, the fourth value is used to indicate that the RU belongs to a first highest frequency 80 MHz in the transmission bandwidth; or when the third field is a first value and the RU is less than or equal to a 996-tone RU, the first value is used to indicate that the RU belongs to primary 80 MHz in the transmission bandwidth, or when the third field is a second value and the RU is less than or equal to a 996-tone RU, the second value is used to indicate that the RU belongs to first secondary 80 MHz in the transmission bandwidth, or when the third field is a third value and the RU is less than or equal to a 996-tone RU, the third value is used to indicate that the RU belongs to second secondary 80 MHz in the transmission bandwidth, or when the third field is a fourth value and the RU is less than or equal to a 996-tone RU, the fourth value is used to indicate that the RU belongs to third secondary 80 MHz in the transmission bandwidth.

Optionally, the RU includes the subblock corresponding to the first field.

According to a fifth aspect, this application provides a resource unit indication apparatus. The apparatus is an AP, and includes a processing module and a sending module. The processing module is configured to generate a PPDU; and the sending module is configured to send the PPDU to a plurality of STAs, where a transmission bandwidth of the PPDU is divided into M subblocks, and M is an integer greater than 1, where the transmission bandwidth is greater than or equal to 80 MHz, the PPDU includes M first fields, the M first fields are in a one-to-one correspondence with the M subblocks, the first field is transmitted on a corresponding subblock, and the first field is used to indicate an RU allocated by the AP to at least one of the plurality of STAs.

According to a sixth aspect, this application provides a resource unit indication apparatus. The apparatus is an STA, and includes a receiving module and a processing module. The receiving module is configured to receive a PPDU sent by an AP, where a transmission bandwidth of the PPDU is divided into M subblocks, and M is an integer greater than 1, where the transmission bandwidth is greater than or equal to 80 MHz, the PPDU includes M first fields, the M first fields are in a one-to-one correspondence with the M subblocks, the first field is transmitted on a corresponding subblock, the first field is used to indicate an RU allocated by the AP to at least one of a plurality of STAs, and the STA is any of the plurality of STAs; and the processing module is configured to parse the PPDU based on the first field.

According to a seventh aspect, this application provides a resource unit indication apparatus. The apparatus is an AP, and includes a processing module and a sending module.

The processing module is configured to generate a PPDU; and the sending module is configured to send the PPDU to a plurality of STAs, where the PPDU includes M trigger frames, and M is an integer greater than 1, where a transmission bandwidth of the PPDU is divided into M subblocks, the transmission bandwidth is greater than or equal to 40 MHz, the M trigger frames are in a one-to-one correspondence with the M subblocks, the trigger frame includes a first field, the first field is transmitted on a subblock corresponding to the trigger frame, and the first field is used to indicate an RU allocated by the AP to at least one of a plurality of STAs.

According to an eighth aspect, this application provides a resource unit indication apparatus. The apparatus is an STA, and includes a receiving module and a processing module. The receiving module is configured to receive a PPDU sent by an AP, where the PPDU includes M trigger frames, and M is an integer greater than 1, where a transmission bandwidth of the PPDU is divided into M subblocks, the transmission bandwidth is greater than or equal to 40 MHz, the M trigger frames are in a one-to-one correspondence with the M subblocks, the trigger frame includes a first field, the first field is transmitted on a subblock corresponding to the trigger frame, the first field is used to indicate an RU allocated by the AP to at least one of a plurality of STAs, and the STA is any of the plurality of STAs; and the processing module is configured to transmit uplink data based on the first field.

According to a ninth aspect, this application provides a resource unit indication apparatus. The apparatus is an AP, and includes a processor and a transmitter. The processor is configured to generate a PPDU; and the transmitter is configured to send the PPDU to a plurality of STAs, where a transmission bandwidth of the PPDU is divided into M subblocks, and M is an integer greater than 1, where the transmission bandwidth is greater than or equal to 80 MHz, the PPDU includes M first fields, the M first fields are in a one-to-one correspondence with the M subblocks, the first field is transmitted on a corresponding subblock, and the first field is used to indicate an RU allocated by the AP to at least one of the plurality of STAs.

According to a tenth aspect, this application provides a resource unit indication apparatus. The apparatus is an STA, and includes a receiver and a processor. The receiver is configured to receive a PPDU sent by an AP, where a transmission bandwidth of the PPDU is divided into M subblocks, and M is an integer greater than 1, where the transmission bandwidth is greater than or equal to 80 MHz, the PPDU includes M first fields, the M first fields are in a one-to-one correspondence with the M subblocks, the first field is transmitted on a corresponding subblock, the first field is used to indicate an RU allocated by the AP to at least one of a plurality of STAs, and the STA is any of the plurality of STAs; and the processor is configured to parse the PPDU based on the first field.

According to an eleventh aspect, this application provides a resource unit indication apparatus. The apparatus is an AP, and includes a processor and a transmitter. The processor is configured to generate a PPDU; and the transmitter is configured to send the PPDU to a plurality of STAs, where the PPDU includes M trigger frames, and M is an integer greater than 1, where a transmission bandwidth of the PPDU is divided into M subblocks, the transmission bandwidth is greater than or equal to 40 MHz, the M trigger frames are in a one-to-one correspondence with the M subblocks, the trigger frame includes a first field, the first field is transmitted on a subblock corresponding to the trigger frame, and the first field is used to indicate an RU allocated by the AP to at least one of the plurality of STAs.

According to a twelfth aspect, this application provides a resource unit indication apparatus. The apparatus is an STA, and includes a receiver and a processor. The receiver is configured to receive a PPDU sent by an AP, where the PPDU includes M trigger frames, and M is an integer greater than 1, where a transmission bandwidth of the PPDU is divided into M subblocks, the transmission bandwidth is greater than or equal to 40 MHz, the M trigger frames are in a one-to-one correspondence with the M subblocks, the trigger frame includes a first field, the first field is transmitted on a subblock corresponding to the trigger frame, the first field is used to indicate an RU allocated by the AP to at least one of a plurality of STAs, and the STA is any of the plurality of STAs; and the processor is configured to transmit uplink data based on the first field.

According to a thirteenth aspect, this application provides a computer storage medium, including a program instruction, where the program instruction is used to implement the foregoing resource unit indication methods.

According to a fourteenth aspect, this application provides a computer program product, including a program instruction, where the program instruction is used to implement the foregoing resource unit indication methods.

This application provides the resource unit indication method and apparatus, and the storage medium. The method includes: the AP sends the PPDU to the plurality of STAs, where the transmission bandwidth of the PPDU is divided into the M subblocks, and M is an integer greater than 1, where the transmission bandwidth is greater than or equal to 80 MHz, the PPDU includes the M first fields, the M first fields are in a one-to-one correspondence with the M subblocks, the first field is transmitted on the corresponding subblock, and the first field is used to indicate an RU allocated by the AP to at least one of the plurality of STAs. Therefore, data transmission in a larger bandwidth is supported at fewer overheads.

BRIEF DESCRIPTION OF DRAWINGS

FIG. 3 is a schematic diagram of an HE-SIG-B indication in a PPDU bandwidth of 80 MHz according to an embodiment of this application;

FIG. 4 is a schematic structural diagram of a high efficient (HE) multiple user (MU) physical protocol data unit (PPDU);

FIG. 5 is a schematic diagram of a channel plan in a bandwidth of 160 MHz according to an embodiment of this application;

FIG. 6 is a schematic diagram of a tone plan and an RU plan of 20 MHz according to an embodiment of this application;

FIG. 10 is a schematic diagram of an HE-SIG-B signal indication in a PPDU bandwidth of 160 MHz according to an embodiment of this application;

FIG. 14 is a schematic diagram of extremely high throughput (EHT)-SIG-B in a subblock unit of 80 MHz (including two CCs) according to an embodiment of this application;

FIG. 15 is a schematic diagram of EHT-SIG-B in a subblock unit of 80 MHz (including four CCs) according to an embodiment of this application;

FIG. 17 is a schematic diagram of subblock combination-based EHT-SIG-B according to an embodiment of this application;

FIG. 19A, FIG. 19B and FIG. 19C are schematic diagrams of EHT-SIG-B in a subblock unit of 160 MHz (two CCs) according to an embodiment of this application;

FIG. 20A and FIG. 20B are schematic diagrams of EHT-SIG-B in a subblock unit of 160 MHz (four CCs) according to an embodiment of this application;

FIG. 21 is a schematic diagram of segment combination-based EHT-SIG-B according to an embodiment of this application;

FIG. 22 is a schematic diagram of segment combination-based EHT-SIG-B according to an embodiment of this application;

FIG. 25 is a schematic diagram of common fields and per STA fields included in four trigger frames in a subblock unit of 80 MHz according to an embodiment of this application;

DESCRIPTION OF EMBODIMENTS

Before describing the technical solutions of this application, the following first describes professional terms related to this application.

1. OFDMA Transmission

A wireless local area network (WLAN) is developed from 802.11a/g to 802.11n and 802.11ac, and to 802.11ax that is currently being discussed, and bandwidths supported by a PPDU of the WLAN are shown below in Table 1.

TABLE 1

|  | 802.11a/g (non-HT) | 802.11n (HT) | 802.11ac (VHT) | 802.11ax (HE) |
| --- | --- | --- | --- | --- |
| Bandwidth | 20 MHz | 20, 40 MHz | 20, 40, 80, 160/80 + 80 MHz | 20, 40, 80, 160/80 + 80 MHz |

The 802.11n standard is referred to as high throughput (HT), the 802.11ac standard is referred to as very high throughput (VHT), and 802.11ax is referred to as high efficient (HE). Standards earlier than HT, such as 802.11a/g, are collectively referred to as non-high throughput (Non-HT).

Figure 1:
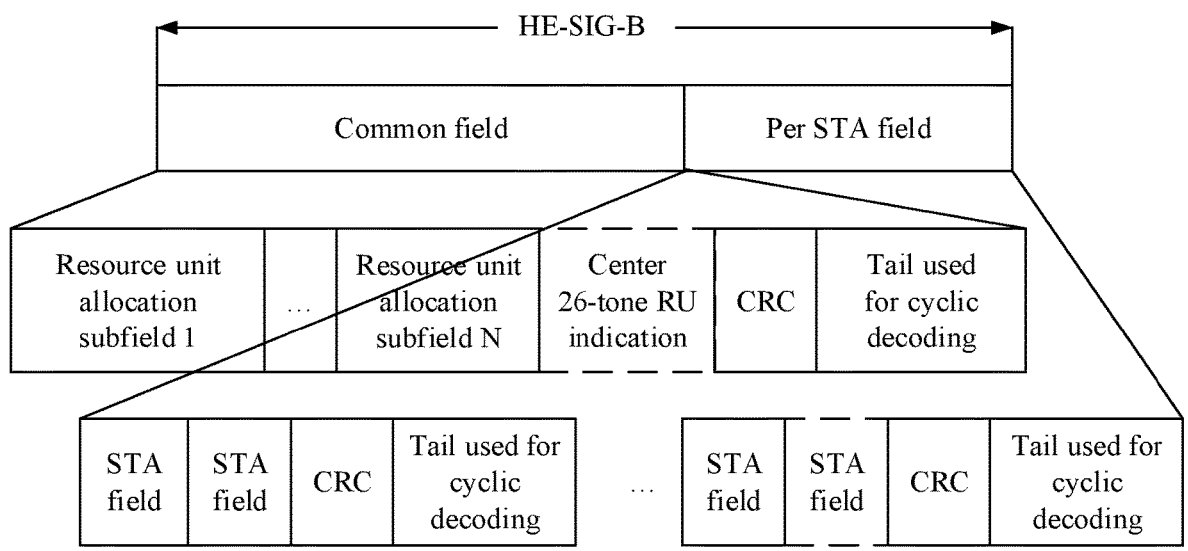
FIG. 1 is a schematic diagram of a coding structure of HE-SIG-B in each 20 MHz according to an embodiment of this application.

The 802.11 standard earlier than the 802.11ax standard supports orthogonal frequency division multiplexing (OFDM) transmission, and an entire bandwidth is centrally allocated to one STA or one group of STAs for single user (SU) transmission or downlink (DL) multiple user (MU) multiple input multiple output (MIMO) transmission. 802.11ax newly introduces an OFDMA technology, and an entire bandwidth is divided into one or more RUs. 802.11ax introduces DL OFDMA and uplink (UL) OFDMA. 802.1ax has four packet formats in total. An HE MU PPDU is mainly used to perform DL OFDMA and DL MU MIMO transmission. FIG. 4 is a schematic structural diagram of a high efficient (HE) multiple user (MU) physical protocol data unit (PPDU). As shown in FIG. 4, the PPDU is divided into a preamble part and a data field part, and the preamble part includes two HE signal field parts: HE-SIG-A and HE-SIG-B. As described above, HE-SIG-A is used to indicate a bandwidth of the PPDU, a quantity of symbols included in HE-SIG-B, an MCS used for HE-SIG-B, whether HE-SIG-B uses a compressed mode, and the like. As shown in FIG. 1, HE-SIG-B mainly includes a common field and a per STA field. The common field includes 1 to N resource unit allocation subfields, a center 26-tone resource unit (26-tone RU) indication field that exists when a bandwidth is greater than or equal to 80 MHz, a CRC subfield used for check, and a tail subfield used for cyclic decoding. In addition, the per STA field has 1 to M STA fields in a resource unit allocation order. Each two of the M STA fields are usually one group and each two STA fields are followed by one CRC field and one tail field, except that the last group may have one or two STA fields.

2. Channel and Access

The 802.11 standard usually uses 20 MHz as a basic bandwidth, and supported bandwidths are generally exponential integer multiples (20, 40, 80, and 160 MHz) of 20 MHz. 20 MHz is used as one channel. For example, FIG. 5 is a schematic diagram of a channel plan in a bandwidth of 160 MHz according to an embodiment of this application. As shown in FIG. 5, an entire 160 MHz channel is divided into a primary 20 MHz (P20) channel (alternatively referred to as a primary channel), a secondary 20 MHz (S20) channel, a secondary 40 MHz (S40) channel, and a secondary 80 MHz (S80) channel.

3. Segment (Seg) Technology in the 802.11Ax/Ac Standard

In the 802.11ax/ac standard, a transmission bandwidth of a PPDU is divided in a segment unit of 80 MHz when the bandwidth is 160 MHz or 80 MHz+80 MHz, to form two segments.

Further, as described above, currently, HE-SIG-B in 802.11ax has provided resource unit indication methods of DL OFDMA and DL MU MIMO. An indication manner of the resource unit allocation subfield depends on tone plans in different PPDU bandwidths in 802.11ax.

FIG. 6 is a schematic diagram of a tone plan and an RU plan of 20 MHz according to an embodiment of this application. As shown in FIG. 6, when a bandwidth is 20 MHz, the entire bandwidth may include one entire 242-tone RU, or may include various combinations of 26-tone RUs, 52-tone RUs, and 106-tone RUs. Some guard tones, empty tones (a tone in which 1 is located in the figure is an empty tone, and 1 indicates that a quantity of empty tones is 1), or direct current (DC) tones are included in addition to the RUs used to transmit data.

Figure 7:
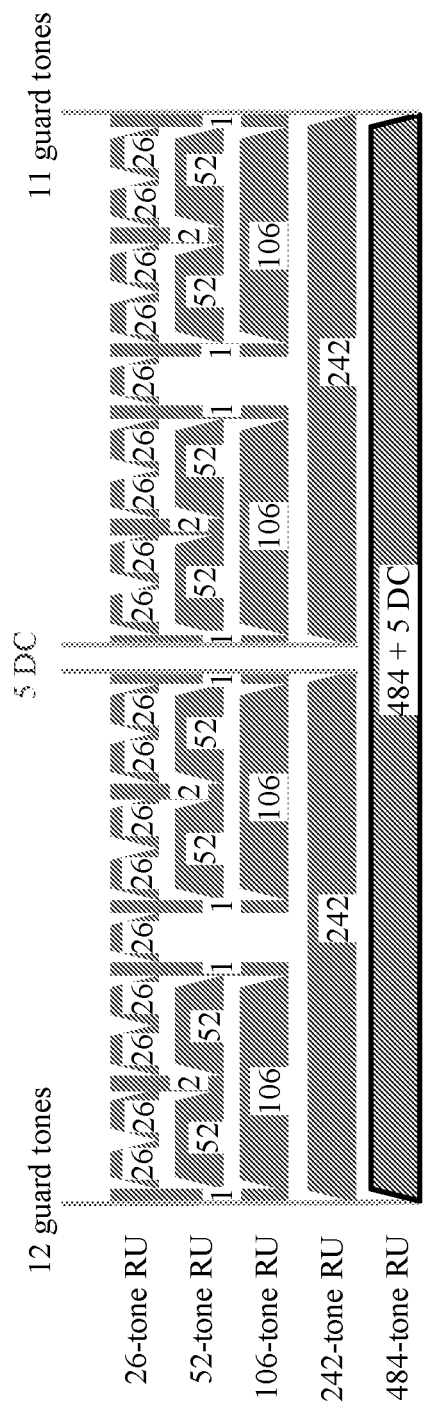
FIG. 7 is a schematic diagram of a tone plan and an RU plan of 40 MHz according to an embodiment of this application.

FIG. 7 is a schematic diagram of a tone plan and an RU plan of 40 MHz according to an embodiment of this application. As shown in FIG. 7, when a bandwidth is 40 MHz, the entire bandwidth is approximately equivalent to a duplicate of 20 MHz tone plans, and the entire bandwidth may include one entire 484-tone RU, or may include various combinations of 26-tone RUs, 52-tone RUs, 106-tone RUs, and 242-tone RUs.

Figure 2:
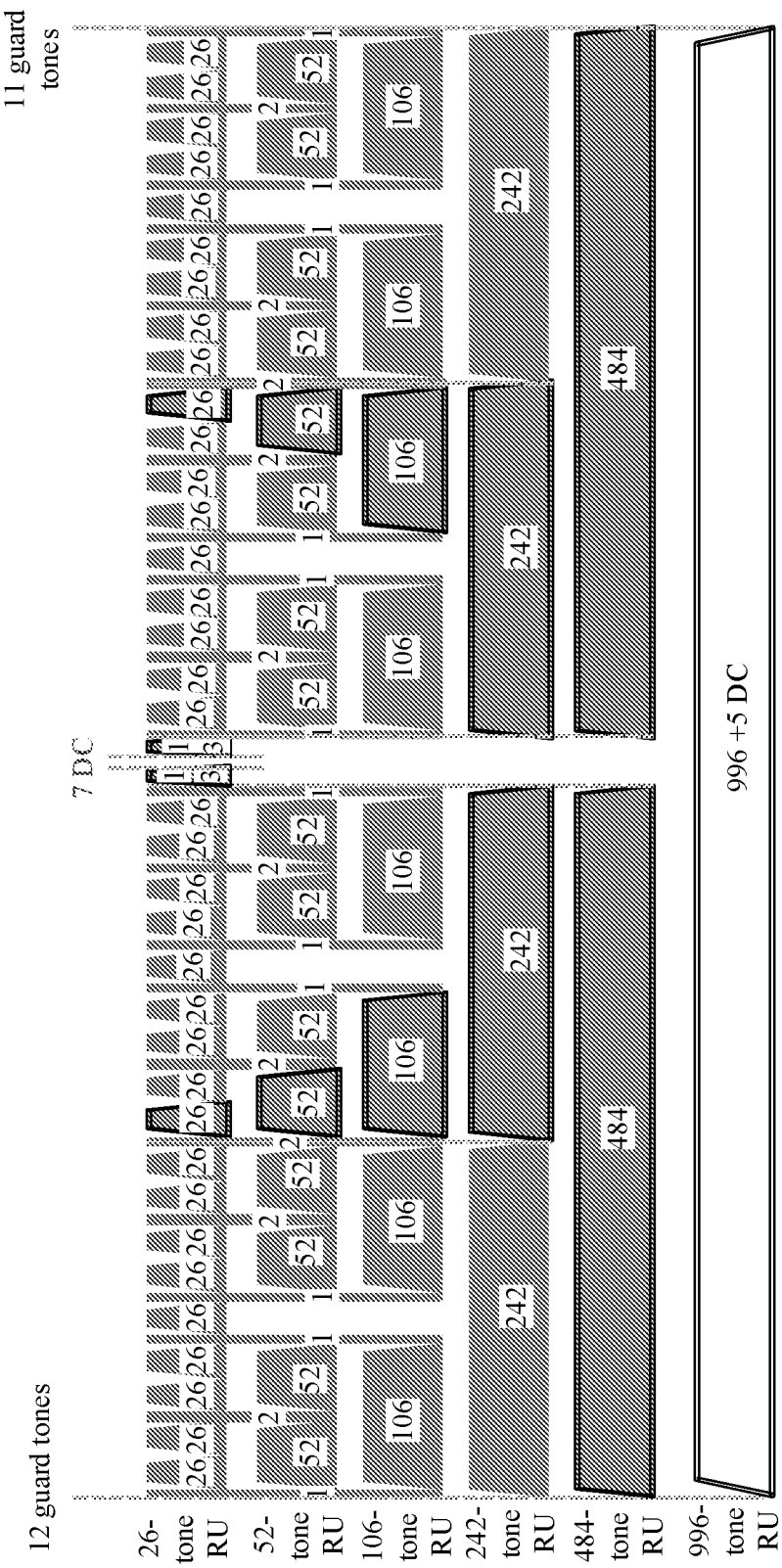
FIG. 2 is a schematic diagram of a tone plan and an RU plan of 80 MHz according to an embodiment of this application.

As described above, FIG. 2 shows a tone plan and an RU plan of 80 MHz. As shown in FIG. 2, when a bandwidth is 80 MHz, the entire bandwidth includes four resource units in a unit of 242-tone RU. In particular, a center 26-tone RU including two 13-tone subunits further exists in the center of the entire bandwidth. The entire bandwidth may include one entire 996-tone RU, or may include various combinations of 26-tone RUs, 52-tone RUs, 106-tone RUs, 242-tone RUs, and 484-tone RUs.

When a bandwidth is 160 MHz or 80 MHz+80 MHz, the entire bandwidth may be considered as a duplicate of two 80 MHz tone plans, and the entire bandwidth may include one entire 2*996-tone RU, or may include various combinations of 26-tone RUs, 52-tone RUs, 106-tone RUs, 242-tone RUs, 484-tone RUs, and 996-tone RUs.

In the foregoing various tone plans, in a unit of 242-tone RU, for FIG. 2, FIG. 6, or FIG. 7, a leftmost side may be considered as a first lowest frequency, and a rightmost side may be considered as a first highest frequency. From left to right, 242-tone RUs may be numbered.

Figure 8:
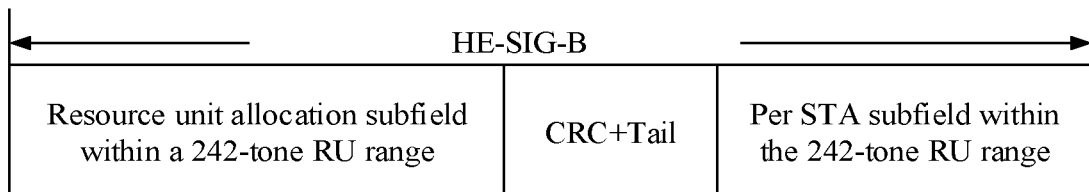
FIG. 8 is a schematic diagram of an HE-SIG-B signal indication in a PPDU bandwidth of 20 MHz according to an embodiment of this application.

As described above, 802.11ax introduces the concept of a content channel CC. FIG. 8 is a schematic diagram of an HE-SIG-B signal indication in a PPDU bandwidth of 20 MHz according to an embodiment of this application. As shown in FIG. 8, when the PPDU bandwidth is only 20 MHz, HE-SIG-B includes only one CC, and the CC includes one resource unit allocation subfield, used to indicate a resource unit allocation indication within a range of a data part 242-tone RU. The resource unit allocation subfield is 8 bits, and all possible resource unit arrangement combination manners in the 242-tone RU are indicated through indexing. In addition, for an RU whose size is greater than or equal to 106-tone, a quantity of users (namely, a quantity of STAs) that perform SU/MU-MIMO transmission in the RU is also indicated through indexing. An index of the resource unit allocation subfield is shown below in Table 2.

TABLE 2

| Resource unit allocation subfield | #1 | #2 | #3 | #4 | #5 | #6 | #7 | #8 | #9 | Entry quantity |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |
| 00001011 | 52 | | 26 | 26 | 26 | 52 | | 52 | | 1 |
| 00001100 | 52 | | 52 | | 26 | 26 | 26 | 26 | 26 | 1 |
| 00001101 | 52 | | 52 | | 26 | 26 | 26 | 52 | | 1 |
| 00001110 | 52 | | 52 | | 26 | 52 | | 26 | 26 | 1 |
| 00001111 | 52 | | 52 | | 26 | 52 | | 52 | | 1 |
| $0001y_2y_1y_0$ | 52 | | 52 | | — | 106 | | | | 8 |
| $0011y_2y_1y_0$ | | 106 | | | — | 52 | | 52 | | 8 |
| $0010y_2y_1y_0$ | 26 | 26 | 26 | 26 | 26 | 106 | | | | 8 |
| $00101y_2y_1y_0$ | 26 | 26 | 52 | | 26 | 106 | | | | 8 |
| $00110y_2y_1y_0$ | 52 | | 26 | 26 | 26 | 106 | | | | 8 |
| $00111y_2y_1y_0$ | 52 | | 52 | | 26 | 106 | | | | 8 |
| $01000y_2y_1y_0$ | | 106 | | | 26 | 26 | 26 | 26 | 26 | 8 |
| $01001y_2y_1y_0$ | | 106 | | | 26 | 26 | 26 | 52 | | 8 |
| $01010y_2y_1y_0$ | | 106 | | | 26 | 52 | | 26 | 26 | 8 |
| $01011y_2y_1y_0$ | | 106 | | | 26 | 52 | | 52 | | 8 |
| $0110y_2y_1y_0$ | | 106 | | | — | 106 | | | | 16 |
| 01110000 | 52 | | 52 | | — | 52 | | 52 | | 1 |
| 01110001 | 242-tone RU empty | | | | | | | | | 1 |
| 01110010 | 484-tone RU with zero User fields indicated in this RU Allocation subfield of the HE-SIG-B content channel | | | | | | | | | 1 |
| 01110011 | 996-tone RU with zero User fields indicated in this RU Allocation subfield of the HE-SIG-B content channel | | | | | | | | | 1 |
| $011101x_1x_0$ | Reserved | | | | | | | | | 4 |
| $01111y_2y_1y_0$ | Reserved | | | | | | | | | 8 |
| $10y_2y_1y_0z_2z_1z_0$ | | 106 | | | 26 | 106 | | | | 64 |
| $11000y_2y_1y_0$ | | 242 | | | | | | | | 8 |
| $11001y_2y_1y_0$ | | 484 | | | | | | | | 8 |
| $11010y_2y_1y_0$ | | 996 | | | | | | | | 8 |
| $11011y_2y_1y_0$ | Reserved | | | | | | | | | 8 |
| $111x_4x_3x_2x_1x_0$ | Reserved | | | | | | | | | 32 |

As shown in Table 2, the first column indicates an 8-bit index of the resource unit allocation subfield, and the middle column #1 to #9 indicates an arrangement combination of different resource units, where a number in a table indicates a quantity of tones included in the resource unit. For example, the index $00111y_2y_1y_0$ indicates that an entire 242-tone RU range is divided into four RUs in total: a 52-tone RU, a 52-tone RU, a 26-tone RU, and a 106-tone RU. In addition, the third column indicates a quantity of entries to which a same resource unit is allocated. The entry quantity is used to indicate a quantity of users included in the 106-tone RU. For example, an entry quantity corresponding to $00010y_2y_1y_0$ is 8, because when indicating resource unit allocation, $y_2y_1y_0$ is further used to indicate a quantity of users included in the 106-tone RU, corresponding to one to eight users (namely, stations), and each value of $y_2y_1y_0$ may be 0 or 1.

In addition, if a PPDU bandwidth is greater than 20 MHz, a resource unit allocation subfield may further indicate a case of a resource unit greater than a 242-tone RU, for example, a 484-tone RU or a 996-tone RU, where the resource unit greater than the 242-tone RU indicates that a resource unit of a larger RU that includes a 242-tone RU in which a STA is located is allocated to the STA.

Further, station information of a STA allocated within the 242-tone RU range is indicated in a per STA field in a resource allocation order.

Figure 9:
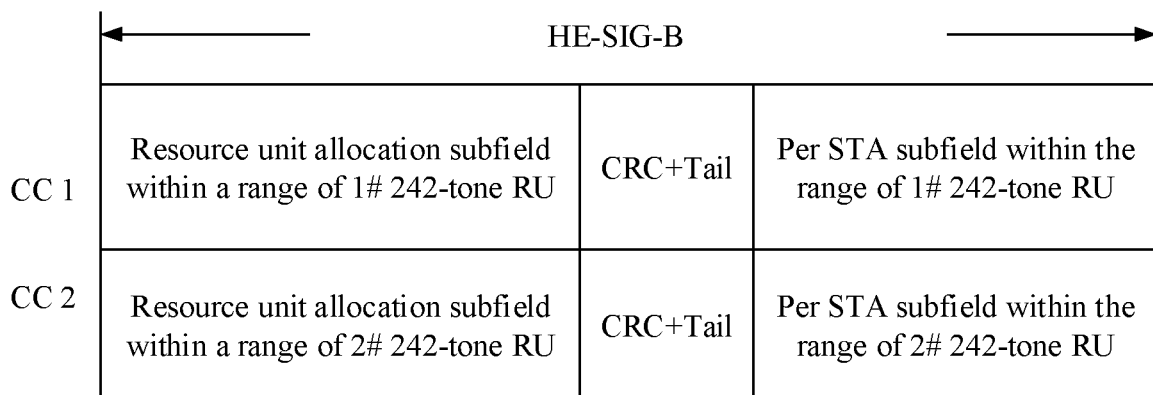
FIG. 9 is a schematic diagram of an HE-SIG-B signal indication in a PPDU bandwidth of 40 MHz according to an embodiment of this application.

FIG. 9 is a schematic diagram of an HE-SIG-B signal indication in a PPDU bandwidth of 40 MHz according to an embodiment of this application. As shown in FIG. 9, when the PPDU bandwidth is 40 MHz, there are two HE-SIG-B content channels: CC1 and CC2. The first HE-SIG-B channel CC1 includes a resource unit allocation subfield within a range of the first 242-tone RU and a corresponding per STA field. The second HE-SIG-B channel CC2 includes a resource unit allocation subfield within a range of the second 242-tone RU and a corresponding per STA field.

FIG. 3 shows an HE-SIG-B signal indication in a PPDU bandwidth of 80 MHz. As shown in FIG. 3, when the PPDU bandwidth is 80 MHz, there are still two CCs and there are four channels in total. Therefore, resource unit allocation information is overall indicated on the four channels based on a structure of CC1, CC2, CC1, and CC2 in ascending order of frequencies. CC1 includes resource unit allocation subfields within ranges of the first and the third 242-tone RUs and a corresponding per STA field within the ranges. CC2 includes resource unit subfields within ranges of the second and the fourth 242-tone RUs and a corresponding per STA field within the ranges. In addition, a center 26-tone RU indication of 80 MHz is carried on each of the two CCs, to indicate whether the resource unit is used to transmit data.

FIG. 10 is a schematic diagram of an HE-SIG-B signal indication in a PPDU bandwidth of 160 MHz according to an embodiment of this application. As shown in FIG. 10, when the PPDU bandwidth is 160 MHz, there are still two CCs and there are eight channels in total. Therefore, resource unit allocation information is overall indicated on the eight channels based on a structure of CC1, CC2, CC1, CC2, CC1, CC2, CC1, and CC2 in ascending order of frequencies. CC1 includes resource unit allocation subfields within ranges of the first, the third, the fifth, and the seventh 242-tone RUs and a corresponding per STA field within the ranges. CC2 includes resource unit subfields within ranges of the second, the fourth, the sixth, and the eighth 242-tone RUs and a corresponding per STA field within the ranges. In addition, two 80 MHz center 26-tone RU indications of 160 MHz are carried on each of the two CCs, to indicate whether the resource unit is used to transmit data.

In addition, for MU-MIMO in a full-bandwidth mode, 802.11ax indicates, in HE-SIG-A, that HE-SIG-B is in a compressed mode and a quantity of users that perform full-bandwidth MU-MIMO transmission. In this case, HE-SIG-B has no common field, and directly indicates a per STA field.

As described above, in other approaches, resource unit indication in cases of 20 MHz to 160 MHz is implemented, but this results in relatively large overheads. For example, when a PPDU bandwidth is 80 MHz, each CC includes two resource unit allocation indication subfields, and includes a per STA field of all users in two 242-tone RUs. Consequently, overheads are relatively large. For another example, when a PPDU bandwidth is 160 MHz, each CC includes four resource unit allocation subfields, and includes a per STA field of all users in four 242-tone RUs. Consequently, overheads are relatively large. When a PPDU bandwidth of 320 MHz is considered in a next-generation standard, overheads are further multiplied. Therefore, how to support OFDMA or MU-MIMO transmission in a larger bandwidth (for example, 320 MHz) at fewer overheads is a problem that needs to be considered in this application.

Figure 11:
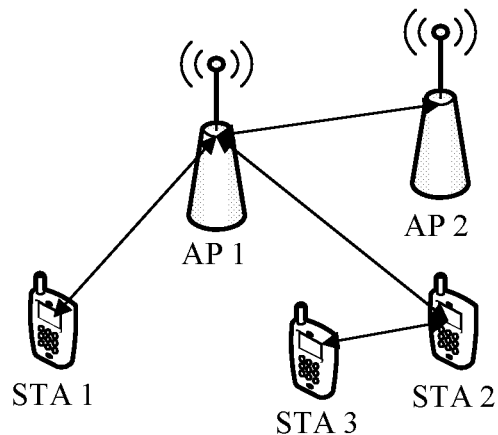
FIG. 11 is a schematic diagram of an application scenario according to an embodiment of this application.

It should be noted that the technical solutions in the embodiments of this application may be applied to a communications system that supports a next-generation standard or a further next-generation standard of 802.11ax in a wireless local area network (WLAN), or may be applied to another communications system that supports OFDM transmission in a large bandwidth. In this application, for ease of description, the next-generation standard of 802.1ax is referred to as extremely high throughput (EHT). It may be understood that the next-generation standard of 802.11ax may also have another name, such as extreme throughput (XT) or ultra high throughput (UHT). This is not limited in this application. For ease of description, a WLAN system is used as an example for description in the embodiments of this application. FIG. 11 is a schematic diagram of an application scenario according to an embodiment of this application. As shown in FIG. 11, the application scenario may include one or more access points APs and one or more STAs. The AP may be a device configured to communicate with a station. The access point may be any device that has a wireless receiving and sending function or a chip that can be disposed in the device. The device includes but is not limited to an evolved NodeB (eNB), a radio network controller (RNC), a NodeB (NB), a base station controller (BSC), a base transceiver station (BTS), a home base station (for example, a home evolved NodeB or a home NodeB (HNB)), a baseband unit (BBU), an access point (AP) in a Wi-Fi system, a wireless relay node, a wireless backhaul node, a transmission point (TP), a transmission and reception point (TRP), and the like. Alternatively, the device may be a base station that supports a $5^{th}$ generation (5G) protocol, or the like. The STA may be a user equipment, an access terminal, a subscriber unit, a subscriber station, a mobile station, a mobile console, a remote station, a remote terminal, a mobile device, a user terminal, a terminal, a wireless communications device, a user agent, or a user apparatus. Alternatively, the station may be a cellular phone, a cordless telephone set, a session initiation protocol (SIP) phone, a station in a wireless local area network, a vehicle-mounted device, a wearable device, a terminal device in a future 5G network, a terminal device in a future evolved public land mobile network (PLMN), or the like.

The technical solutions in this application are applicable to data communication between an AP and one or more STAs, also applicable to communication between an AP and a plurality of APs, and further applicable to communication between a STA and a plurality of STAs. The following uses data communication between an AP and a plurality of STAs as an example to describe the technical solutions in this application.

A main procedure of the technical solutions in this application is as follows: An AP sends a PPDU to a STA. A transmission bandwidth of the PPDU is divided into M subblocks. The PPDU includes EHT-SIG-B corresponding to each subblock (namely, the first field in the following Embodiment 1 and Embodiment 2. Alternatively, EHT-SIG-B includes the first field when the subblock includes a plurality of CCs). Optionally, the PPDU further includes EHT-SIG-A corresponding to each subblock (namely, the second field in Embodiment 1 and Embodiment 2. Alternatively, EHT-SIG-A includes the second field when the subblock includes a plurality of CCs). The AP indicates, using the first field in each subblock, an RU allocation status of a STA in the subblock corresponding to the first field. When a size of an RU indicated by the first field is less than or equal to a maximum RU included in the subblock corresponding to the first field, the RU indicated by the first field is allocated to only a STA in the subblock to which the STA belongs. When a size of an RU indicated by the first field is greater than a maximum RU included in the subblock corresponding to the first field, the RU indicated by the first field is a subblock combination or a segment combination.

After receiving the PPDU, the STA obtains a first field of a subblock to which the STA belongs, and determines, using the first field, an RU allocated to the STA. The RU is the subblock, a subblock combination, or a segment combination corresponding to the first field.

Embodiment 1

Figure 12:
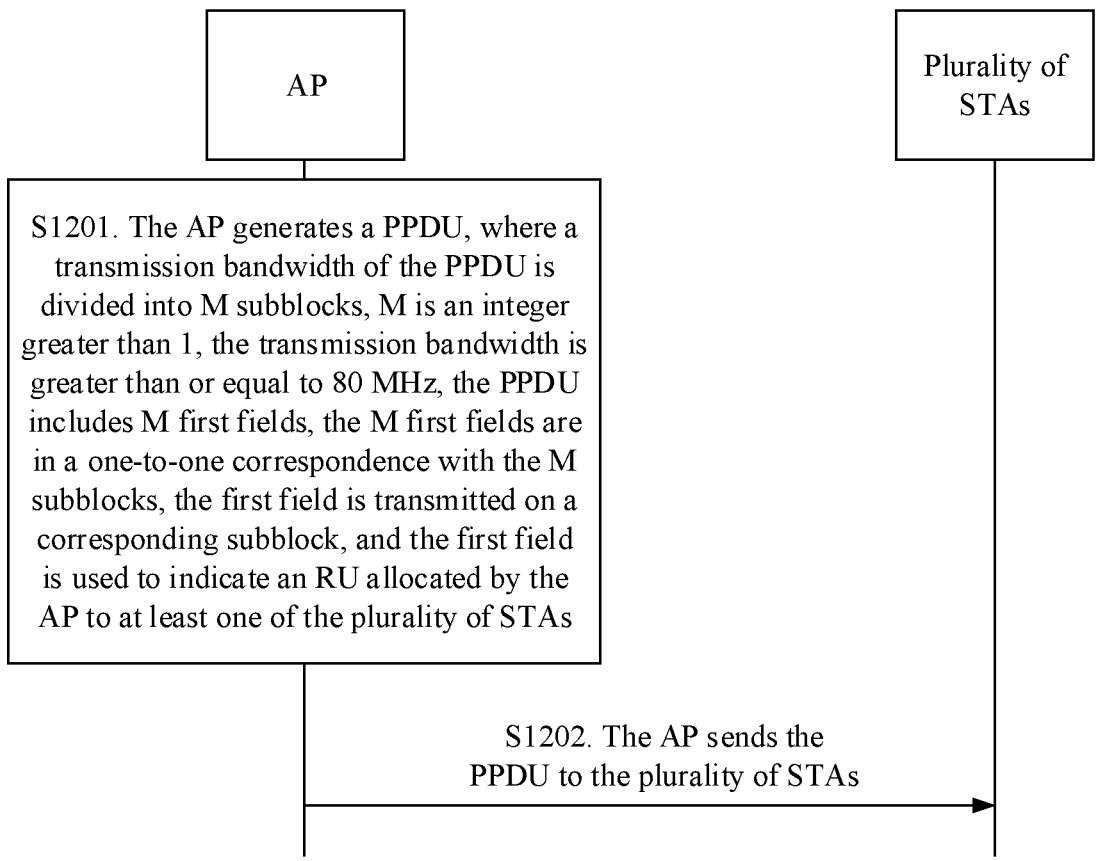
FIG. 12 is a flowchart of a resource unit indication method according to an embodiment of this application.

For example, FIG. 12 is a flowchart of a resource unit indication method according to an embodiment of this application. As shown in FIG. 12, the method includes the following steps.

Step S1201: An AP generates a PPDU, where a transmission bandwidth of the PPDU is divided into M subblocks, M is an integer greater than 1, the transmission bandwidth is greater than or equal to 80 MHz, the PPDU includes M first fields, the M first fields are in a one-to-one correspondence with the M subblocks, the first field is transmitted on a corresponding subblock, and the first field is used to indicate an RU allocated by the AP to at least one of a plurality of STAs.

Step S1202: The AP sends the PPDU to the plurality of STAs.

A station that receives the PPDU may parse a data field of the PPDU based on the first field. For example, the station that receives the PPDU may determine, based on the first field, a specific RU in which data of the STA is carried. Further, the STA may receive and parse the data of the STA in the corresponding RU.

Optionally, in a subblock unit of 80 MHz, a subblock is understood as a "segment (Seg)" in the 802.11ax/ac standard. In a subblock unit of 160 MHz or a larger bandwidth, a subblock is a part, and the subblock includes at least one segment.

Optionally, in this embodiment of this application, the PPDU includes a preamble part and a data field part. The preamble part includes the M first fields (the first field may be understood as EHT-SIG-B of each subblock, or may be understood as a resource unit allocation subfield in EHT-SIG-B. For convenience, the first field is considered as the resource unit allocation subfield in EHT-SIG-B in the following, to describe the resource unit indication method). Optionally, the PPDU may further include M second fields (the second field may be understood as EHT-SIG-A).

Further, as described above, the first field is used to indicate an RU allocated by the AP to at least one of the plurality of STAs. When the RU indicated by the first field is less than or equal to a maximum RU included in the subblock corresponding to the first field, the RU indicated by the first field is located in the subblock corresponding to the first field. When the RU indicated by the first field is greater than a maximum RU included in the subblock corresponding to the first field, the RU indicated by the first field is a subblock combination including a plurality of subblocks, or the RU indicated by the first field is a segment combination including all or some segments included in a plurality of subblocks. For example, STA1 and STA2 correspond to a subblock 1, and when an RU allocated to STA1 and STA2 is less than a maximum RU in the subblock 1, the AP indicates, using a first field corresponding to the subblock 1, that the RU allocated to STA1 and STA2 is the first 242-tone RU in the subblock 1. For another example, STA3 and STA4 correspond to a subblock 2, and when an RU allocated to STA3 and STA4 is greater than a maximum RU in the subblock 2, the AP indicates, using a first field corresponding to the subblock 2, that the RU allocated to STA3 and STA4 is a subblock combination RU including a subblock 1 and the subblock 2.

The following further describes the resource unit indication method using the following Example 1 and Example 2.

Example 1

The following describes the resource unit indication method using an example in which the transmission bandwidth of the PPDU is 320 MHz and M=4 (in a subblock unit of 80 MHz, the entire bandwidth is divided into four subblocks).

Figure 13:
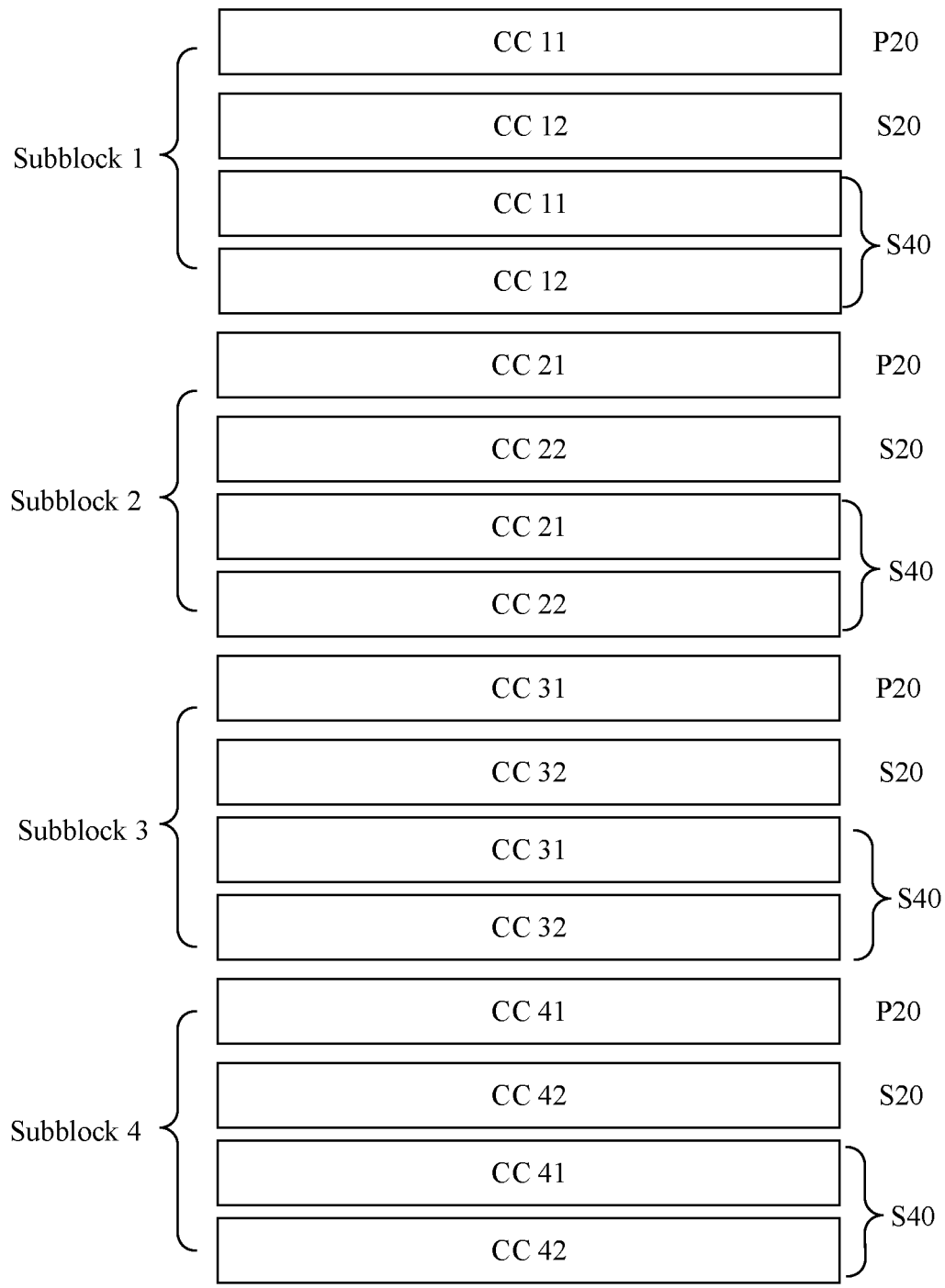
FIG. 13 is a schematic diagram of a 320 MHz bandwidth in a subblock unit of 80 MHz according to an embodiment of this application.

FIG. 13 is a schematic diagram of a 320 MHz bandwidth in a subblock unit of 80 MHz according to an embodiment of this application. As shown in FIG. 13, the 320 MHz bandwidth is divided into four subblocks: Part 1, Part 2, Part 3, and Part 4. In each subblock, the AP configures corresponding P20, S20, and S40 channels for a STA in the subblock to which the STA belongs. It may be considered that the entire bandwidth has a plurality of (temporary) P20 channels.

As described above, the first field is used to indicate an RU allocated by the AP to at least one of the plurality of STAs. For example, FIG. 14 is a schematic diagram of EHT-SIG-B in a subblock unit of 80 MHz (including two CCs) according to an embodiment of this application. As shown in FIG. 14, each subblock includes four channels and two CCs. In Part 1, CC11 carries the following information: resource unit allocation subfields (which are respectively first fields corresponding to Part 1) within ranges of the first 242-tone RU and the third 242-tone RU of Part 1 and per STA information of a STA allocated in the corresponding 242-tone RU ranges. CC12 carries the following information: resource unit allocation subfields (which are respectively first fields corresponding to Part 1) within ranges of the second and the fourth 242-tone RUs of Part 1 and per STA information of a STA allocated in the corresponding 242-tone RU ranges. In Part 2, CC21 carries the following information: resource unit allocation subfields (first fields corresponding to Part 2) within ranges of the fifth and the seventh 242-tone RUs of Part 2 and per STA information of a STA allocated in the corresponding 242-tone RU ranges. CC22 carries the following information: resource unit allocation subfields (first fields corresponding to Part 2) within ranges of the sixth and the eighth 242-tone RUs of Seg 2 and per STA information of a STA allocated in the corresponding 242-tone RU ranges. In Part 3, CC31 carries the following information: resource unit allocation subfields (first fields corresponding to Part 3) within ranges of the ninth and the eleventh 242-tone RUs of Seg 3 and per STA information of a STA allocated in the corresponding 242-tone RU ranges. CC32 carries the following information: resource unit allocation subfields (first fields corresponding to Part 3) within ranges of the tenth and the twelfth 242-tone RUs of Seg 3 and per STA information of a STA allocated in the corresponding 242-tone RU ranges. In Part 4, CC41 carries the following information: resource unit allocation subfields (first fields corresponding to Part 4) within ranges of the thirteenth and the fifteenth 242-tone RUs of Seg 3 and per STA information of a STA allocated in the corresponding 242-tone RU ranges. CC42 carries the following information: resource unit allocation subfields (first fields corresponding to Part 4) within ranges of the fourteenth and the sixteenth 242-tone RUs of Seg 4 and per STA information of a STA allocated in the corresponding 242-tone RU ranges.

It should be noted that the first 242-tone RU to the sixteenth 242-tone RU are described for the entire bandwidth of the PPDU.

It should be noted that FIG. 14 includes the two CCs, and actually, four CCs may alternatively be used. For example, FIG. 15 is a schematic diagram of EHT-SIG-B in a subblock unit of 80 MHz (including four CCs) according to an embodiment of this application. As shown in FIG. 15, in this case, each CC needs to indicate a resource unit allocation subfield within a range of only one 242-tone RU, to further reduce overheads.

For the resource unit allocation subfield, when a size of an RU allocated to a STA is less than or equal to a 996-tone RU (namely, a maximum RU in a subblock unit of 80 MHz), the resource unit subfield shown in Table 2 may be used to indicate a resource.

When a size of an RU allocated to a STA is greater than a 996-tone RU, a resource may be indicated in any of the following manners.

In a first manner, some or all subblock combination RUs are indicated using a reserved field.

For example, when the RU indicated by the resource unit allocation subfield is a subblock combination, a correspondence between the resource unit allocation subfield and the subblock combination RU includes at least one entry shown in Table 3 below.

TABLE 3

| Resource unit allocation subfield | Subblock combination RU |
| --- | --- |
| First value | Part 1 + Part 2 |
| Second value | Part 1 + Part 3 |
| Third value | Part 1 + Part 4 |
| Fourth value | Part 2 + Part 3 |
| Fifth value | Part 2 + Part 4 |
| Sixth value | Part 3 + Part 4 |
| Seventh value | Part 1 + Part 2 + Part 3 |
| Eighth value | Part 1 + Part 2 + Part 4 |
| Ninth value | Part 1 + Part 3 + Part 4 |
| Tenth value | Part 2 + Part 3 + Part 4 |
| Eleventh value | Part 1 + Part 2 + Part 3 + Part 4 |

Part 1, Part 2, Part 3, and Part 4 are the four different subblocks.

Optionally, lengths of the first value, the second value, the third value, the fourth value, the fifth value, the sixth value, the seventh value, the eighth value, the ninth value, the tenth value, and the eleventh value are all 8 bits. In other words, the resource unit allocation subfield may be 8 bits.

It should be noted that the mapping relationship between the resource unit allocation subfield and the subblock combination may be changed, and is not limited to the case enumerated in this embodiment of this application. For example, the mapping relationship may alternatively be as follows: When the resource unit allocation subfield is a first value, the subblock combination is a combination of Part 1 and Part 3. When the resource unit allocation subfield is a second value, the subblock combination is a combination of Part 1 and Part 2. It may be understood that other alternative cases also fall within the protection scope of the embodiments of this application. The subblock identifiers used in the table are logical identifiers of the subblocks. Usually, a subblock identifier 1 (Part 1) indicates a first lowest frequency 80 MHz channel including a primary 20 MHz channel, a subblock identifier 2 (Part 2) indicates a second lowest frequency 80 MHz channel adjacent to Part 1, a subblock identifier 3 (Part 3) indicates a higher frequency 80 MHz channel adjacent to Part 2, and a subblock identifier 4 (Part 4) indicates a first highest frequency 80 MHz channel adjacent to Part 3. The foregoing describes a common mapping relationship between a subblock identifier and a channel. Another mapping relationship between a subblock identifier and a channel also exists. This is not limited in this application.

In addition, the foregoing table enumerates all possible combination cases of the four subblocks. In actual application, only some combination cases in the foregoing table may be included. In an example, the resource unit allocation subfield may be a combination of subblocks consecutive in frequency domain. For example, only six of the foregoing 11 combination cases may be included: Part 1+Part 2, Part 2+Part 3, Part 3+Part 4, Part 1+Part 2+Part 3, Part 2+Part 3+Part 4, and Part 1+Part 2+Part 3+Part 4.

For example, an example of the correspondence between the resource unit allocation subfield and the indicated subblock combination RU is shown below in Table 4.

TABLE 4

| Resource unit allocation subfield | Subblock combination RU | Entry quantity |
|---|---|---|
| 01110100 | Part 1 + Part 2 | 1 |
| 01110101 | Part 1 + Part 3 | 1 |
| 01110110 | Part 1 + Part 4 | 1 |
| 01110111 | Part 2 + Part 3 | 1 |
| 01111000 | Part 2 + Part 4 | 1 |
| 01111001 | Part 3 + Part 4 | 1 |
| 01111010 | Part 1 + Part 2 + Part 3 | 1 |
| 01111011 | Part 1 + Part 2 + Part 4 | 1 |
| 01111100 | Part 1 + Part 3 + Part 4 | 1 |
| 01111101 | Part 2 + Part 3 + Part 4 | 1 |
| 01111110 | Part 1 + Part 2 + Part 3 + Part 4 | 1 |
| 01111111 | Reserved field | 1 |

For example, if a subblock combination Part 1+Part 2 is allocated to the at least one STA and a size is 2*996-tone, a value of the resource unit allocation subfield may be 01110100.

As described above, the resource unit allocation subfield is used to indicate an RU allocated to at least one STA. Further, EHT-SIG-B may include indication information, and the indication information is used to indicate a quantity of the at least one STA, namely, a quantity of STAs that transmit data in the RU indicated by the resource unit allocation subfield. Still further, when the RU indicated by the resource unit allocation subfield is a subblock combination, an indication manner of the indication information includes the following two cases.

In a first case, for each subblock, all CCs included in the subblock carry same indication information, and the indication information is used to indicate a quantity of STAs that transmit data on a subblock combination RU indicated by a resource unit allocation subfield.

In a second case, for a subblock, the subblock carries a plurality of CCs, all the CCs carry different indication information, a STA quantity indicated by indication information on each CC is a part of a quantity of STAs that transmit data on the subblock combination RU, and each CC includes a user information field of this part of STAs. It is assumed that the subblock includes CC1 and CC2, CC may carry first indication information, CC2 carries second indication information, and the first indication information and the second indication information jointly indicate the quantity of STAs that transmit data on the subblock combination RU indicated by the resource unit allocation subfield. For example, the quantity may be a sum of a STA quantity indicated by the first indication information and a STA quantity indicated by the second indication information. For example, five STAs perform transmission in the RU, CC1 includes user information fields of three of the five STAs, the STA quantity indicated by the first indication information is 3, CC2 includes user information fields of the two STAs other than the three STAs, and the STA quantity indicated by the second indication information is 2. Therefore, the STA quantity jointly indicated by the first indication information and the second indication information is 5.

Figure 16:
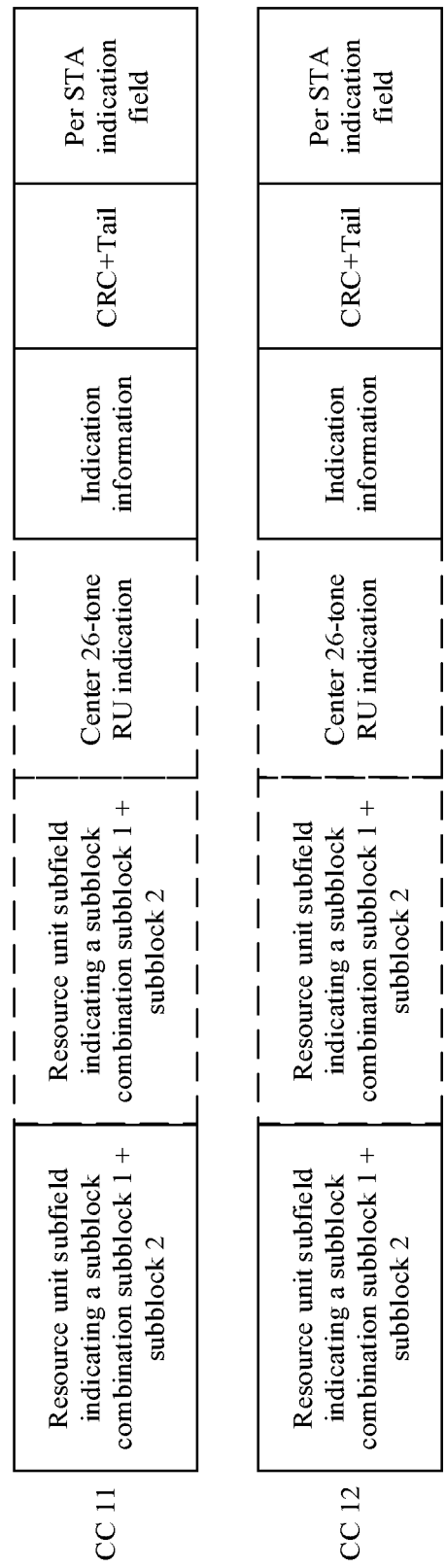
FIG. 16 is a schematic diagram of subblock combination-based EHT-SIG-B according to an embodiment of this application.

An example in which the RU indicated by the resource unit allocation subfield includes a combination of Part 1 and Part 2 (Part 1+Part 2) is used for description. FIG. 16 is a schematic diagram of subblock combination-based EHT-SIG-B according to an embodiment of this application. As shown in FIG. 16, EHT-SIG-B includes a resource unit subfield used to indicate a subblock combination Part 1+Part 2 and indication information, and the indication information is used to indicate a quantity of STAs that transmit data using Part 1+Part 2. An indication manner of the indication information may be the foregoing two manners. Details are not described herein again.

It should be noted that, because EHT-SIG-B has included the resource unit subfield used to indicate the subblock combination Part 1+Part 2, resource unit allocation subfields (indicated by broken line boxes in the figure) of the second, the third, and the fourth 242-tone RUs do not need to repeatedly indicate the subblock combination Part 1+Part 2. Certainly, to ensure a consistent field format, the resource unit allocation subfields of the second, the third, and the fourth 242-tone RUs may alternatively repeatedly indicate the subblock combination Part 1+Part 2. In other words, two resource unit subfields on CC11 have a same value, and RUs indicated by the two resource unit subfields are both Part 1+Part 2. This is not limited in this application. In this case, a center 26-tone RU does not exist, and therefore may be set to 0, to indicate that the 26-tone RU is not separately allocated to any STA.

Based on this, for the transmission bandwidth of 320 MHz, each CC in existing 802.11ax includes resource unit allocation subfields within ranges of eight 242-tone RUs. However, in the first manner of Example 1, the AP indicates a resource based on a subblock, and each CC includes resource unit allocation subfields within ranges of only two 242-tone RUs. Therefore, resource overheads of the indication manner provided in this application are reduced to one quarter compared with resource overheads of the indication manner in 802.11ax.

In a second manner, in addition to a subblock combination RU, the resource unit allocation subfield is used to indicate a quantity of STAs (a quantity of users) that transmit data on the subblock combination RU. A correspondence between the resource unit allocation subfield and the subblock combination RU and the quantity of STAs that transmit data on the subblock combination includes at least one of the following entries, and is shown below in Table 5.

TABLE 5

| Resource unit allocation subfield | Subblock combination RU and user quantity |
|---|---|
| First value | Part 1 + Part 2, first quantity |
| Second value | Part 1 + Part 2, second quantity |
| . . . | . . . |
| Eighth value | Part 1 + Part 2, eighth quantity |
| Ninth value | Part 1 + Part 3, first quantity |
| Tenth value | Part 1 + Part 3, second quantity |
| . . . | . . . |
| Sixteenth value | Part 1 + Part 3, eighth quantity |
| Seventeenth value | Part 1 + Part 4, first quantity |
| Eighteenth value | Part 1 + Part 4, second quantity |
| . . . | . . . |
| Twenty-fourth value | Part 1 + Part 4, eighth quantity |
| Twenty-fifth value | Part 2 + Part 3, first quantity |
| Twenty-sixth | value Part 2 + Part 3, second quantity |

TABLE 5-continued

| Resource unit allocation subfield | Subblock combination RU and user quantity |
|---|---|
| . . . | . . . |
| Thirty-second value | Part 2 + Part 3, eighth quantity |
| Thirty-third value | Part 2 + Part 4, first quantity |
| Thirty-fourth value | Part 2 + Part 4, second quantity |
| . . . | . . . |
| Fortieth value | Part 2 + Part 4, eighth quantity |
| Forty-first value | Part 3 + Part 4, first quantity |
| Forty-second | value Part 3 + Part 4, second quantity |
| . . . | . . . |
| Forty-eighth value | Part 3 + Part 4, eighth quantity |
| Forty-ninth value | Part 1 + Part 2 + Part 3, first quantity |
| Fiftieth value | Part 1 + Part 2 + Part 3, second quantity |
| . . . | . . . |
| Fifty-sixth value | Part 1 + Part 2 + Part 3, eighth quantity |
| Fifty-seventh value | Part 1 + Part 2 + Part 4, first quantity |
| Fifty-eighth value | Part 1 + Part 2 + Part 4, second quantity |
| . . . | . . . |
| Sixty-fourth value | Part 1 + Part 2 + Part 4, eighth quantity |
| Sixty-fifth value | Part 1 + Part 3 + Part 4, first quantity |
| Sixty-sixth value | Part 1 + Part 3 + Part 4, second quantity |
| . . . | . . . |
| Seventy-second value | Part 1 + Part 3 + Part 4, eighth quantity |
| Seventy-third value | Part 2 + Part 3 + Part 4, first quantity |
| Seventy-fourth value | Part 2 + Part 3 + Part 4, second quantity |
| . . . | . . . |
| Eightieth value | Part 2 + Part 3 + Part 4, eighth quantity |
| Eighty-first value | Part 1 + Part 2 + Part 3 + Part 4, first quantity |
| Eighty-second value | Part 1 + Part 2 + Part 3 + Part 4, second quantity |
| . . . | . . . |
| Eighty-eighth value | Part 1 + Part 2 + Part 3 + Part 4, eighth quantity |

Part 1, Part 2, Part 3, and Part 4 are the four different subblocks.

Optionally, lengths of the first value to the eighty-eighth value are all 9 bits. In other words, the resource unit allocation subfield may be 9 bits.

Optionally, values of the first quantity, the second quantity, the third quantity, the fourth quantity, the fifth quantity, the sixth quantity, the seventh quantity, and the eighth quantity in Table 5 are integers greater than or equal to 1 and less than or equal to 8. For example, the first quantity may be 1. The mapping relationship shown in Table 5 shows only all correspondences.

Further, the mapping relationship between the resource unit allocation subfield and the subblock combination and the STA quantity may be changed, and is not limited to the case enumerated in this embodiment of this application. For example, the mapping relationship may alternatively be as follows: When the resource unit allocation subfield is a first value, the subblock combination is a combination of Part 1 and Part 3, and the user quantity is a first quantity. When the resource unit allocation subfield is a second value, the subblock combination is a combination of Part 1 and Part 2, and the user quantity is a first quantity. It may be understood that other alternative cases also fall within the protection scope of the embodiments of this application. The subblock identifiers used in the table are logical identifiers of the subblocks. Usually, a subblock identifier 1 (Part 1) indicates a first lowest frequency 80 MHz channel including a primary 20 MHz channel, a subblock identifier 2 (Part 2) indicates a second lowest frequency 80 MHz channel adjacent to Part 1, a subblock identifier 3 (Part 3) indicates a higher frequency 80 MHz channel adjacent to Part 2, and a subblock identifier 4 (Part 4) indicates a first highest frequency 80 MHz channel adjacent to Part 3. The foregoing describes a common mapping relationship between a subblock identifier and a channel. Another mapping relationship between a subblock identifier and a channel also exists. This is not limited in this application.

In addition, the foregoing table enumerates all possible combination cases of the four subblocks. In actual application, only some of all the possible combination cases in the foregoing table may be included. In an example, the resource unit allocation subfield may be a combination of subblocks consecutive in frequency domain. For example, only six of the foregoing 11 combination cases may be included: Part 1+Part 2, Part 2+Part 3, Part 3+Part 4, Part 1+Part 2+Part 3, Part 2+Part 3+Part 4, and Part 1+Part 2+Part 3+Part 4.

For example, an example of a correspondence between a value of the resource unit allocation subfield and the indicated subblock combination RU and the user quantity is shown below in Table 6.

TABLE 6

| Resource unit allocation subfield | Subblock combination RU and user quantity | Entry quantity |
|---|---|---|
| (0)01110100 | Part 1 + Part 2, 1 | 1 |
| (0)01110101 | Part 1 + Part 2, 2 | 1 |
| (0)01110110 | Part 1 + Part 2, 3 | 1 |
| (0)01110111 | Part 1 + Part 2, 4 | 1 |
| (0)01111000 | Part 1 + Part 2, 5 | 1 |
| (0)01111001 | Part 1 + Part 2, 6 | 1 |
| (0)01111010 | Part 1 + Part 2, 7 | 1 |
| (0)0111011 | Part 1 + Part 2, 8 | 1 |
| (0)01110100 | Part 1 + Part 3, 1 | 1 |
| (0)01110101 | Part 1 + Part 3, 2 | 1 |
| (0)01110110 | Part 1 + Part 3, 3 | 1 |
| (0)01110111 | Part 1 + Part 3, 4 | 1 |
| (0)11011000 | Part 1 + Part 3, 5 | 1 |
| (0)11011001 | Part 1 + Part 3, 6 | 1 |
| (0)11011010 | Part 1 + Part 3, 7 | 1 |
| (0)11011011 | Part 1 + Part 3, 8 | 1 |
| (0)11011100 | Part 1 + Part 4, 1 | 1 |
| (0)11011101 | Part 1 + Part 4, 2 | 1 |
| (0)11011110 | Part 1 + Part 4, 3 | 1 |
| (0)11011111 | Part 1 + Part 4, 4 | 1 |
| (0)111$x_4x_3x_2x_1x_0$ | Part 1 + Part 4, 5 to 8<br>Part 2 + Part 3, 1 to 8<br>Part 2 + Part 4, 1 to 8<br>Part 3 + Part 4, 1 to 8<br>Part 1 + Part 2 + Part 3, 1 to 4 | 32 |
| . . . | . . . | |
| (1)$x_7x_6x_5x_4x_3x_2x_1x_0$ | Part 1 + Part 2 + Part 3, 5 to 8<br>Part 1 + Part 2 + Part 4, 1 to 8<br>Part 1 + Part 3 + Part 4, 1 to 8<br>Part 2 + Part 3 + Part 4, 1 to 8<br>Part 1 + Part 2 + Part 3 + Part 4, 1 to 8 | 256 |
| . . . | | |

$x_4x_3x_2x_1x_0$ is an arrangement combination of 0 and 1, and a value of $x_4x_3x_2x_1x_0$ may be any of 32 combinations (00000 to 11111). For example, $x_4x_3x_2x_1x_0$ is 0000. Likewise, $x_7x_6x_5x_4x_3x_2x_1x_0$ is an arrangement combination of 0 and 1, and a value of $x_7x_6x_5x_4x_3x_2x_1x_0$ may be any of 256 combinations (00000000 to 11111111). For example, $x_7x_6x_5x_4x_3x_2x_1x_0$ is 00000000.

It should be noted that, it may be learned that if an 8-bit indication is still used, a reserved entry is not enough to indicate all the cases, and therefore some of the foregoing cases may be indicated. In another embodiment manner, the resource unit allocation subfield may be extended from 8 bits to 9 bits (0 or 1 in brackets in Table 6 indicates that 1 bit is added). When the resource unit allocation subfield is 9 bits, the resource unit allocation subfield may correspond to all the correspondences enumerated in Table 6. Further, the quantity of users that transmit data in the subblock combination may be extended to be greater than 8, for example, 16.

Optionally, the subblock combination includes the subblock corresponding to the resource unit allocation subfield. For example, if the subblock corresponding to the resource unit allocation subfield is Part 1, the subblock combination may be Part 1+Part 2, Part 1+Part 3, Part 1+Part 4, Part 1+Part 2+Part 3, or the like. Therefore, different resource indication methods may be designed for different subblocks. As shown in Table 7, the subblock combination indicated by the resource unit allocation subfield includes the subblock corresponding to the resource unit allocation subfield, such that resource overheads can be further reduced.

TABLE 7

| Resource unit allocation subfield | Subblock combination including Part 1 and user quantity | Subblock combination including Part 2 and user quantity | Subblock combination including Part 3 and user quantity | Subblock combination including Part 4 and user quantity |
|---|---|---|---|---|
| First value | Part 1 + Part 2, first quantity | Part 1 + Part 2, first quantity | | |
| Second value | Part 1 + Part 3, second quantity | | Part 1 + Part 3, second quantity | |
| Third value | Part 1 + Part 4, third quantity | | | Part 1 + Part 4, third quantity |
| Fourth value | Part 1 + Part 2 + Part 3, fourth quantity | Part 1 + Part 2 + Part 3, fourth quantity | Part 1 + Part 2 + Part 3, fourth quantity | Part 1 + Part 2 + Part 3, fourth quantity |
| Fifth value | Part 1 + Part 2 + Part 3 + Part 4, fifth quantity | Part 1 + Part 2 + Part 3 + Part 4, fifth quantity | Part 1 + Part 2 + Part 3 + Part 4, fifth quantity | Part 1 + Part 2 + Part 3 + Part 4, fifth quantity |
| Sixth value | | Part 2 + Part 3, sixth quantity | Part 2 + Part 3, sixth quantity | |
| Seventh value | | Part 2 + Part 4, seventh quantity | | Part 2 + Part 4, seventh quantity |
| Eighth value | | Part 2 + Part 3 + Part 4, eighth quantity | Part 2 + Part 3 + Part 4, eighth quantity | Part 2 + Part 3 + Part 4, eighth quantity |
| Ninth value | | | Part 3 + Part 4, ninth quantity | Part 3 + Part 4, ninth quantity |
| Tenth value | Part 1 + Part 2 + Part 4, tenth quantity | Part 1 + Part 2 + Part 4, tenth quantity | | Part 1 + Part 2 + Part 4, tenth quantity |

Part 1, Part 2, Part 3, and Part 4 are the four different subblocks.

Optionally, lengths of the first value, the second value, the third value, the fourth value, the fifth value, the sixth value, the seventh value, the eighth value, the ninth value, and the tenth value are all 9 bits. In other words, the resource unit allocation subfield may be 9 bits.

Optionally, values of the first quantity, the second quantity, the third quantity, the fourth quantity, the fifth quantity, the sixth quantity, the seventh quantity, the eighth quantity, the ninth quantity, and the tenth quantity in Table 7 are integers greater than or equal to 1 and less than or equal to 8. For example, the first quantity may be 1. The mapping relationship shown in Table 7 shows only some correspondences. For example, Table 7 may be further extended. For example, Table 7 includes an eleventh value, a corresponding subblock combination and user quantity are Part 1+Part 2 and an eleventh quantity, and the eleventh quantity may be 2.

For example, an example of a correspondence between a value of the resource unit allocation subfield and the indicated subblock combination RU and the STA quantity is shown below in Table 8.

TABLE 8

| Resource unit allocation subfield | Subblock combination including Part 1 and user quantity | Subblock combination including Part 2 and user quantity | Subblock combination including Part 3 and user quantity | Subblock combination including Part 4 and user quantity |
|---|---|---|---|---|
| 11100000 | Part 1 + Part 2, user quantity is 1 | Part 1 + Part 2, user quantity is 1 | | |
| 11100001 | Part 1 + Part 3, user quantity is 2 | | Part 1 + Part 3, user quantity is 2 | |

TABLE 8-continued

| Resource unit allocation subfield | Subblock combination including Part 1 and user quantity | Subblock combination including Part 2 and user quantity | Subblock combination including Part 3 and user quantity | Subblock combination including Part 4 and user quantity |
|---|---|---|---|---|
| 11100010 | Part 1 + Part 4, user quantity is 3 | | | Part 1 + Part 4, user quantity is 3 |
| 11100011 | Part 1 + Part 2 + Part 3, user quantity is 3 | Part 1 + Part 2 + Part 3, user quantity is 3 | Part 1 + Part 2 + Part 3, user quantity is 3 | Part 1 + Part 2 + Part 3, user quantity is 3 |
| 11100100 | Part 1 + Part 2 + Part 3 + Part 4, user quantity is 4 | Part 1 + Part 2 + Part 3 + Part 4, user quantity is 4 | Part 1 + Part 2 + Part 3 + Part 4, user quantity is 4 | Part 1 + Part 2 + Part 3 + Part 4, user quantity is 4 |
| 11100101 | | Part 2 + Part 3, user quantity is 2 | Part 2 + Part 3, user quantity is 2 | |
| 11100110 | | Part 2 + Part 4, user quantity is 2 | | Part 2 + Part 4, user quantity is 2 |
| 11100111 | | Part 2 + Part 3 + Part 4, user quantity is 5 | Part 2+ 30 Part 3 + Part 4, user quantity is 5 | Part 2 + Part 3 + Part 4, user quantity is 5 |
| 11101000 | | | Part 3 + Part 4, user quantity is 2 | Part 3 + Part 4, user quantity is 2 |
| 11101001 | Part 1 + Part 2 + Part 4, user quantity is 2 | Part 1 + Part 2 + Part 4, user quantity is 2 | | Part 1 + Part 2 + Part 4, user quantity is 2 |

Based on this, for the transmission bandwidth of 320 MHz, each CC in existing 802.11ax includes resource unit allocation subfields within ranges of eight 242-tone RUs. However, in the second manner of Example 1, the AP indicates a resource based on a subblock, and each CC includes resource unit allocation subfields within ranges of only two 242-tone RUs. Therefore, resource overheads of the indication manner provided in this application are reduced to one quarter compared with resource overheads of the indication manner in 802.11ax. Further, the subblock combination indicated by the resource unit allocation subfield includes the subblock corresponding to the resource unit allocation subfield, such that resource overheads can be further reduced.

In a third manner, a subblock combination is indicated in a compressed mode. For example, the PPDU includes EHT-SIG-A corresponding to each subblock and EHT-SIG-B corresponding to each subblock. EHT-SIG-A carries indication information indicating that the subblock to which EHT-SIG-A belongs uses a compressed mode. EHT-SIG-B includes a resource unit allocation subfield, and the resource unit allocation subfield is used to indicate a subblock combination. Optionally, for example, FIG. 17 is a schematic diagram of subblock combination-based EHT-SIG-B according to an embodiment of this application. As shown in FIG. 17, EHT-SIG-B includes a resource unit allocation subfield on each of CC11 and CC12, and the resource unit allocation subfield is used to indicate a subblock combination. Further, EHT-SIG-B further includes indication information on CC11 and CC12, and the indication information is used to indicate a quantity of STAs that transmit data in the subblock combination. Alternatively, EHT-SIG-B respectively includes first indication information and second indication information on CC11 and CC12, and the first indication information and the second indication information are used to jointly indicate a quantity of STAs that transmit data in the subblock combination.

Further, the resource unit allocation subfield is shown in Table 9, and indicates some or all possible subblock combinations. Optionally, the indication information may be further included. In addition, the indication information may alternatively be combined with the resource unit allocation subfield, to implement a uniform indication. The entire subblock indicates that an entire subblock allocated to the STA is allocated to the STA as one RU.

TABLE 9

| Resource unit allocation subfield | Subblock combination RU |
|---|---|
| First value | Entire subblock to which a STA belongs |
| Second value | Part 1 + Part 2 |
| Third value | Part 1 + Part 3 |
| Fourth value | Part 1 + Part 4 |
| Fifth value | Part 2 + Part 3 |
| Sixth value | Part 2 + Part 4 |
| Seventh value | Part 3 + Part 4 |
| Eighth value | Part 1 + Part 2 + Part 3 |
| Ninth value | Part 1 + Part 2 + Part 4 |
| Tenth value | Part 1 + Part 3 + Part 4 |
| Eleventh value | Part 2 + Part 3 + Part 4 |
| Twelfth value | Part 1 + Part 2 + Part 3 + Part 4 |

Part 1, Part 2, Part 3, and Part 4 are the four different subblocks.

Optionally, lengths of the first value, the second value, the third value, the fourth value, the fifth value, the sixth value, the seventh value, the eighth value, the ninth value, and the twelfth value are all 8 bits. In other words, the resource unit allocation subfield may be 8 bits.

For example, an example of a correspondence between a value of the resource unit allocation subfield and the indicated subblock combination RU is shown below in Table 10.

TABLE 10

| Resource unit allocation subfield | Subblock combination |
|---|---|
| 0000 | Entire subblock to which a STA belongs |
| 0001 | Part 1 + Part 2 |
| 0010 | Part 1 + Part 3 |
| 0011 | Part 1 + Part 4 |
| 0100 | Part 2 + Part 3 |
| 0101 | Part 2 + Part 4 |
| 0110 | Part 3 + Part 4 |
| 0111 | Part 1 + Part 2 + Part 3 |
| 1000 | Part 1 + Part 2 + Part 4 |

TABLE 10-continued

| Resource unit allocation subfield | Subblock combination |
|---|---|
| 1001 | Part 1 + Part 3 + Part 4 |
| 1010 | Part 2 + Part 3 + Part 4 |
| 1011 | Part 1 + Part 2 + Part 3 + Part 4 |

In the third manner of Example 1, an indication manner of the compressed mode is used, such that resource overheads can be reduced. Further, a subblock combination indication method is designed in this manner.

Example 2

The resource unit indication method is described using an example in which the transmission bandwidth of the PPDU is 320 MHz and M=2 (the entire bandwidth is divided into two subblocks in a subblock unit of 160 MHz).

Figure 18:
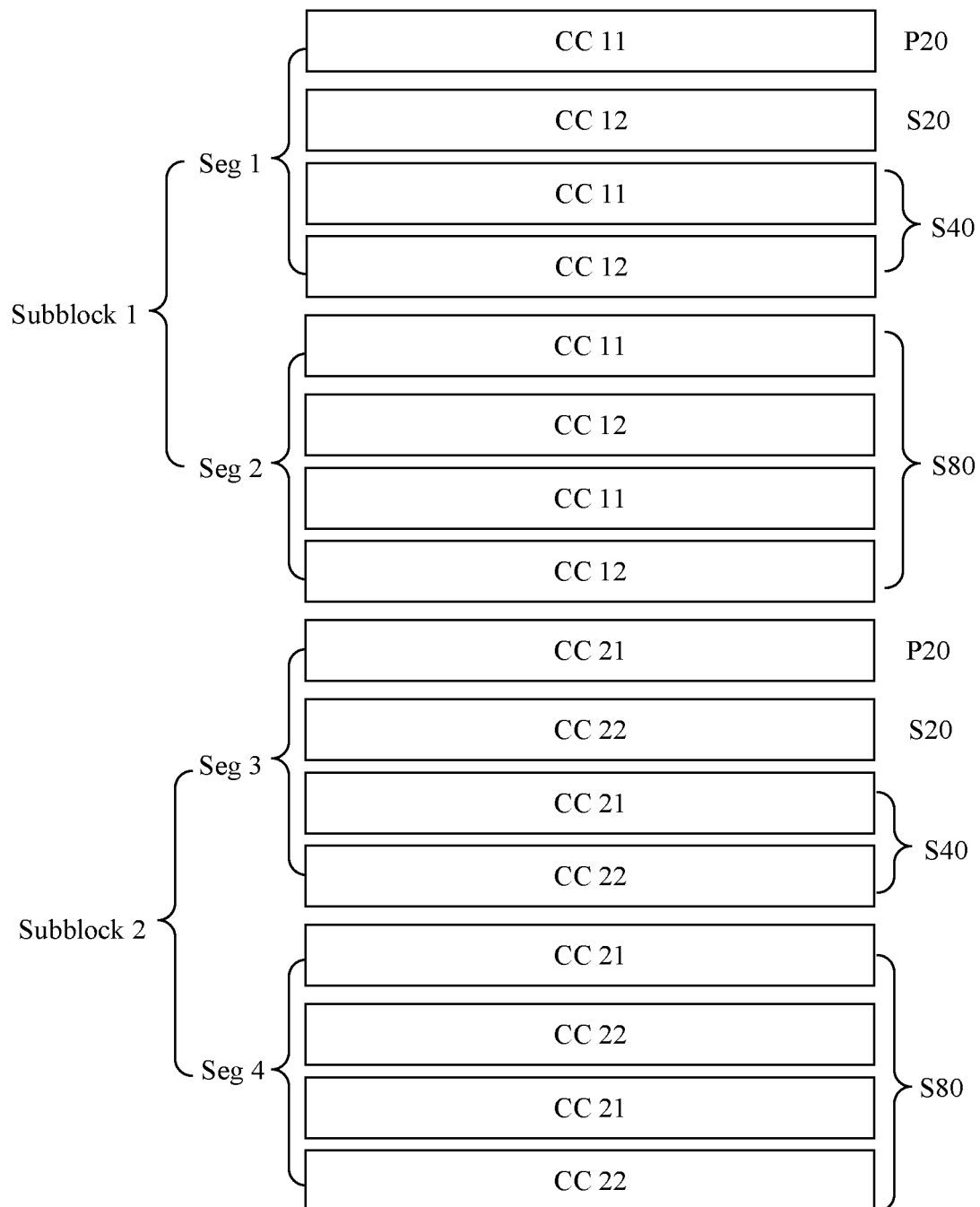
FIG. 18 is a schematic diagram of a 320 MHz bandwidth in a subblock unit of 160 MHz according to an embodiment of this application.

FIG. 18 is a schematic diagram of a 320 MHz bandwidth in a subblock unit of 160 MHz according to an embodiment of this application. As shown in FIG. 18, the 320 MHz bandwidth is divided into two subblocks: Part 1 and Part 2. Each subblock includes two segments (in a segment unit of 80 MHz). In each subblock, corresponding P20, S20, S40, and S80 channels are configured for a STA in the subblock to which the STA belongs. It may be considered that the entire bandwidth has two (temporary) P20 channels. Each subblock includes two CCs or four CCs. For example, each subblock in FIG. 19A, FIG. 19B and FIG. 19C includes two CCs, and each subblock in FIG. 20A and FIG. 20B includes four CCs. FIG. 19A, FIG. 19B and FIG. 19C are a schematic diagram of EHT-SIG-B in a subblock unit of 160 MHz (two CCs) according to an embodiment of this application. FIG. 20A and FIG. 20B are a schematic diagram of EHT-SIG-B in a subblock unit of 160 MHz (four CCs) according to an embodiment of this application.

For the resource unit allocation subfield, when a size of an RU allocated to a STA is less than or equal to 2*996-tone (namely, a maximum RU in a subblock unit of 160 MHz), a corresponding entry shown in Table 2 is used to indicate a resource unit, and a 2*996-tone RU indication needs to be supplemented. For details, refer to Table 11.

TABLE 11

| Resource unit allocation subfield | RU | Entry quantity |
|---|---|---|
| 11011000 | 2 * 996-tone RU | 1 |

When a size of an RU allocated to a STA is greater than a 2*996-tone RU, a resource may be indicated in any of the following manners:

In a first manner, some or all segment combinations are indicated using a reserved field. For example, when the RU indicated by the resource unit allocation subfield is a segment combination, a correspondence between the resource unit allocation subfield and the segment combination RU includes at least one entry shown below in Table 12.

TABLE 12

| Resource unit allocation subfield | Segment combination RU |
|---|---|
| First value | Seg 1 + Seg 2 + Seg 3 |
| Second value | Seg 1 + Seg 2 + Seg 4 |
| Third value | Seg 1 + Seg 3 + Seg 4 |
| Fourth value | Seg 2 + Seg 3 + Seg 4 |
| Fifth value | Seg 1 + Seg 2 + Seg 3 + Seg 4 |

Seg 1, Seg 2, Seg 3, and Seg 4 are the four different segments.

Optionally, lengths of the first value, the second value, the third value, the fourth value, and the fifth value are all 8 bits. In other words, the resource unit allocation subfield may be 8 bits.

It should be noted that the mapping relationship between the resource unit allocation subfield and the segment combination may be changed, and is not limited to the case enumerated in this embodiment of this application. For example, the mapping relationship may alternatively be as follows: When the resource unit allocation subfield is a first value, the segment combination is a combination of Seg 1, Seg 2, and Seg 4. When the resource unit allocation subfield is a second value, the segment combination is a combination of Seg 1, Seg 2, and Seg 3. It may be understood that other alternative cases also fall within the protection scope of the embodiments of this application. The segment identifiers used in the table are logical identifiers of the segments. Usually, a segment identifier 1 (Seg 1) indicates a first lowest frequency 80 MHz channel including a primary 20 MHz channel, a segment identifier 2 (Seg 2) indicates a second lowest frequency 80 MHz channel adjacent to Seg 1, a segment identifier 3 (Seg 3) indicates a higher frequency 80 MHz channel adjacent to Seg 2, and a segment identifier 4 (Seg 4) indicates a first highest frequency 80 MHz channel adjacent to Seg 3. The foregoing describes a common mapping relationship between a segment identifier and a channel. Another mapping relationship between a segment identifier and a channel also exists. This is not limited in this application.

In addition, the foregoing table enumerates all possible combination cases of the four segments. In actual application, only some of all the possible combination cases in the foregoing table may be included. In an example, the resource unit allocation subfield may be a combination of segments consecutive in frequency domain. For example, only two of the foregoing five combination cases may be included: Seg 1+Seg 2+Seg 3 and Seg 1+Seg 2+Seg 4.

For example, an example of a correspondence between a value of the resource unit allocation subfield and the indicated segment combination RU is shown in Table 13.

TABLE 13

| Resource unit allocation subfield | Segment combination RU | Entry quantity |
|---|---|---|
| 01110100 | Seg 1 + Seg 2 + Seg 3 | 1 |
| 01110101 | Seg 1 + Seg 2 + Seg 4 | 1 |
| 01110110 | Seg 1 + Seg 3 + Seg 4 | 1 |
| 01110111 | Seg 2 + Seg 3 + Seg 4 | 1 |
| 01111000 | Seg 1 + Seg 2 + Seg 3 + Seg 4 | 1 |

As described above, the resource unit allocation subfield is used to indicate an RU allocated to at least one STA. Further, EHT-SIG-B may include indication information, and the indication information is used to indicate a quantity of the at least one STA, namely, a quantity of STAs (a quantity of users) that transmit data in the RU indicated by the resource unit allocation subfield. Still further, when the RU indicated by the resource unit allocation subfield is a segment combination, a carry manner of the indication information includes the following two cases.

In a first case, for each segment, each CC included in the segment carries indication information, and the indication information is used to indicate a quantity of STAs that transmit data on a segment combination RU indicated by a resource unit allocation subfield.

In a second case, for a segment, it is assumed that the segment includes CC1 and CC2, CC1 may carry first indication information, CC2 carries second indication information, and the first indication information and the second indication information jointly indicate a quantity of STAs that transmit data on a segment combination RU indicated by a resource unit allocation subfield. For example, the quantity may be a sum of a STA quantity indicated by the first indication information and a STA quantity indicated by the second indication information.

An example in which the RU indicated by the resource unit allocation subfield includes a combination Seg 1+Seg 2 is used for description.

FIG. 21 is a schematic diagram of segment combination-based EHT-SIG-B according to an embodiment of this application. As shown in FIG. 21, EHT-SIG-B includes a resource unit allocation subfield used to indicate a segment combination Seg 1+Seg 2 and indication information, and the indication information is used to indicate a quantity of STAs that transmit data using Seg 1+Seg 2. It should be noted that, because EHT-SIG-B has included the resource unit subfield used to indicate the segment combination Seg 1+Seg 2, resource unit allocation subfields (indicated by broken line boxes in the figure) of the second, the third, the fourth, the fifth, the sixth, the seventh, and the eighth 242-tone RUs do not need to repeatedly indicate the segment combination Seg 1+Seg 2. Certainly, to ensure a consistent field format, the resource unit allocation subfields of the second, the third, the fourth, the fifth, the sixth, the seventh, and the eighth 242-tone RUs may alternatively repeatedly indicate the segment combination Seg 1+Seg 2. This is not limited in this application. In this case, a center 26-tone RU does not exist, and therefore may be set to 0, to indicate that the 26-tone RU is not separately allocated to any STA.

Based on this, for the transmission bandwidth of 320 MHz, each CC in existing 802.11ax includes resource unit allocation subfields within ranges of eight 242-tone RUs. However, in the first manner of Example 2, the AP indicates a resource based on a segment, and each CC includes resource unit allocation subfields within ranges of only four 242-tone RUs. Therefore, resource overheads of the indication manner provided in this application are reduced to one half compared with resource overheads of the indication manner in 802.11ax.

In a second manner, in addition to a segment combination RU, the resource unit allocation subfield is used to indicate a quantity of STAs that transmit data on the segment combination RU. A correspondence between the resource unit allocation subfield and the segment combination RU and the quantity of STAs that transmit data on the segment combination includes at least one of the following entries, and is shown in Table 14.

TABLE 14

| Resource unit allocation subfield | Segment combination RU and user quantity |
| --- | --- |
| First value | Seg 1 + Seg 2 + Seg 3, first quantity |
| Second value | Seg 1 + Seg 2 + Seg 4, second quantity |
| Third value | Seg 1 + Seg 3 + Seg 4, third quantity |

TABLE 14-continued

| Resource unit allocation subfield | Segment combination RU and user quantity |
| --- | --- |
| Fourth value | Seg 2 + Seg 3 + Seg 4, fourth quantity |
| Fifth value | Seg 1 + Seg 2 + Seg 3 + Seg 4, fifth quantity |

Seg 1, Seg 2, Seg 3, and Seg 4 are the four different segments.

Optionally, lengths of the first value, the second value, the third value, the fourth value, and the fifth value are all 9 bits. In other words, the resource unit allocation subfield may be 9 bits.

Optionally, values of the first quantity, the second quantity, the third quantity, the fourth quantity, and the fifth quantity in Table 14 are integers greater than or equal to 1 and less than or equal to 8. For example, the first quantity may be 1. The mapping relationship shown in Table 14 shows only some correspondences. For example, Table 14 may be further extended. For example, Table 14 includes a sixth value, a corresponding segment combination and STA quantity are Seg 1+Seg 2+Seg 3 and a sixth quantity, and the sixth quantity may be 2.

Further, the mapping relationship between the resource unit allocation subfield and the segment combination and the STA quantity may be changed, and is not limited to the case enumerated in this embodiment of this application. For example, the mapping relationship may alternatively be as follows: When the resource unit allocation subfield is a first value, the segment combination is a combination of Seg 1, Seg 3, and Seg 4, and the STA quantity is a seventh quantity. When the resource unit allocation subfield is a second value, the segment combination is a combination of Seg 1, Seg 2, and Seg 3, and the STA quantity is an eighth quantity. It may be understood that other alternative cases also fall within the protection scope of the embodiments of this application. The segment identifiers used in the table are logical identifiers of the segments. Usually, a segment identifier 1 (Seg 1) indicates a first lowest frequency 80 MHz channel including a primary 20 MHz channel, a segment identifier 2 (Seg 2) indicates a second lowest frequency 80 MHz channel adjacent to Seg 1, a segment identifier 3 (Seg 3) indicates a higher frequency 80 MHz channel adjacent to Seg 2, and a segment identifier 4 (Seg 4) indicates a first highest frequency 80 MHz channel adjacent to Seg 3. The foregoing describes a common mapping relationship between a segment identifier and a channel. Another mapping relationship between a segment identifier and a channel also exists. This is not limited in this application.

In addition, the foregoing table enumerates some possible combination cases of the four segments. In actual application, only some of all the possible combination cases in the foregoing table or a correspondence that is not in Table 14 may be included. In an example, the resource unit allocation subfield may be a combination of segments consecutive in frequency domain. For example, only two of the foregoing five combination cases may be included: Seg 1+Seg 2+Seg 3 and Seg 1+Seg 2+Seg 3+Seg 4.

For example, an example of a correspondence between a value of the resource unit allocation subfield and the indicated segment combination RU and the STA quantity is shown in Table 15.

TABLE 15

| Resource unit allocation subfield | Segment field RU and user quantity | Entry quantity |
|---|---|---|
| (0)01111000 | Seg 1 + Seg 2 + Seg 3, 1 | 1 |
| (0)11100000 | Seg 1 + Seg 2 + Seg 4, 1 | 1 |
| (0)11100001 | Seg 1 + Seg 3 + Seg 4, 2 | 1 |
| (0)11100010 | Seg 2 + Seg 3 + Seg 4, 2 | 1 |
| (0)11100011 | Seg 1 + Seg 2 + Seg 3 + Seg 4, 1 | 1 |

It should be noted that, it may be learned that if an 8-bit indication is still used, a reserved entry is not enough to indicate all the cases, and therefore some of the foregoing cases may be indicated. In another embodiment manner, the resource unit allocation subfield may be extended from 8 bits to 9 bits (0 or 1 in brackets in Table 15 indicates that 1 bit is added). When the resource unit allocation subfield is 9 bits, the resource unit allocation subfield may correspond to all the correspondences enumerated in Table 15. Further, the quantity of users that transmit data in the segment combination may be extended to be greater than 8, for example, 16.

Optionally, the segment combination includes a segment corresponding to the resource unit allocation subfield. For example, if the segment corresponding to the resource unit allocation subfield is Seg 1, the segment combination indicated by the resource unit allocation subfield is not Seg 2+Seg 3+Seg 4, and a STA located in Seg 4 is not allocated to Seg 1+Seg 2+Seg 3. Therefore, different tables may be designed for different segments. As shown in Table 16, the segment combination indicated by the resource unit allocation subfield includes the segment corresponding to the resource unit allocation subfield, such that resource overheads can be further reduced.

TABLE 16

| Resource unit allocation subfield | Segment combination including Seg 1 and user quantity | Segment combination including Seg 2 and user quantity | Segment combination including Seg 3 and user quantity | Segment combination including Seg 4 and user quantity |
|---|---|---|---|---|
| First value | Seg 1 + Seg 2 + Seg 3, first quantity | Seg 1 + Seg 2 + Seg 3, first quantity | Seg 1 + Seg 2 + Seg 3, first quantity | |
| Second value | Seg 1 + Seg 2 + Seg 4, second quantity | Seg 1 + Seg 2 + Seg 4, second quantity | | Seg 1 + Seg 2 + Seg 4, second quantity |
| Third value | Seg 1 + Seg 3 + Seg 4, third quantity | | Seg 1 + Seg 3 + Seg 4, third quantity | Seg 1 + Seg 3 + Seg 4, third quantity |
| Fourth value | | Seg 2 + Seg 3 + Seg 4, fourth quantity | Seg 2 + Seg 3 + Seg 4, fourth quantity | Seg 2 + Seg 3 + Seg 4, fourth quantity |
| Fifth value | Seg 1 + Seg 2 + Seg 3 + Seg 4, fifth quantity | Seg 1 + Seg 2 + Seg 3 + Seg 4, fifth quantity | Seg 1 + Seg 2 + Seg 3 + Seg 4, fifth quantity | Seg 1 + Seg 2 + Seg 3 + Seg 4, fifth quantity |

Seg 1, Seg 2, Seg 3, and Seg 4 are the four different segments.

Optionally, lengths of the first value, the second value, the third value, the fourth value, and the fifth value are all 9 bits. In other words, the resource unit allocation subfield may be 9 bits.

Optionally, values of the first quantity, the second quantity, the third quantity, the fourth quantity, and the fifth quantity in Table 16 are integers greater than or equal to 1 and less than or equal to 8. For example, the first quantity may be 1. The mapping relationship shown in Table 16 shows only some correspondences. For example, Table 16 may be further extended. For example, Table 16 includes a sixth value, a corresponding segment combination and STA quantity are Seg 1+Seg 2+Seg 3 and a seventh quantity, and the seventh quantity may be 2.

For example, an example of a correspondence between a value of the resource unit allocation subfield and the indicated segment combination RU and the STA quantity is shown in Table 17.

TABLE 17

| Resource unit allocation subfield | Segment combination including Seg 1 and user quantity | Segment combination including Seg 2 and user quantity | Segment combination including Seg 3 and user quantity | Segment combination including Seg 4 and user quantity |
|---|---|---|---|---|
| (0)01111000 | Seg 1 + Seg 2 + Seg 3, 1 | Seg 1 + Seg 2 + Seg 3, 1 | Seg 1 + Seg 2 + Seg 3, 1 | |
| (0)11100000 | Seg 1 + Seg 2 + Seg 4, 1 | Seg 1 + Seg 2 + Seg 4, 1 | | Seg 1 + Seg 2 + Seg 4, 1 |

TABLE 17-continued

| Resource unit allocation subfield | Segment combination including Seg 1 and user quantity | Segment combination including Seg 2 and user quantity | Segment combination including Seg 3 and user quantity | Segment combination including Seg 4 and user quantity |
| --- | --- | --- | --- | --- |
| (0)11100001 | Seg 1 + Seg 3 + Seg 4, 2 | | Seg 1 + Seg 3 + Seg 4, 2 | Seg 1 + Seg 3 + Seg 4, 2 |
| (0)11100010 | | Seg 2 + Seg 3 + Seg 4, 2 | Seg 2 + Seg 3 + Seg 4, 2 | Seg 2 + Seg 3 + Seg 4, 2 |
| (0)11100011 | Seg 1 + Seg 2 + Seg 3 + Seg 4, 1 | Seg 1 + Seg 2 + Seg 3 + Seg 4, 1 | Seg 1 + Seg 2 + Seg 3 + Seg 4, 1 | Seg 1 + Seg 2 + Seg 3 + Seg 4, 1 |

Based on this, for the transmission bandwidth of 320 MHz, each CC in existing 802.11ax includes resource unit allocation subfields within ranges of eight 242-tone RUs. However, in the second manner of Example 2, the AP indicates a resource based on a segment, and each CC includes resource unit allocation subfields within ranges of only four 242-tone RUs. Therefore, resource overheads of the indication manner provided in this application are reduced to one half compared with resource overheads of the indication manner in 802.11ax. Further, the segment combination indicated by the resource unit allocation subfield includes the segment corresponding to the resource unit allocation subfield, such that resource overheads can be further reduced.

In a third manner, a subblock combination is indicated in a compressed mode. For example, the PPDU includes EHT-SIG-A corresponding to each subblock and EHT-SIG-B corresponding to each subblock. EHT-SIG-A carries indication information indicating that the subblock to which EHT-SIG-A belongs uses a compressed mode. EHT-SIG-B includes a resource unit allocation subfield, and the resource unit allocation subfield is used to indicate a subblock combination. Optionally, for example, FIG. 22 is a schematic diagram of segment combination-based EHT-SIG-B according to an embodiment of this application. As shown in FIG. 22, EHT-SIG-B includes a resource unit allocation subfield on each of CC1 and CC2, and the resource unit allocation subfield is used to indicate a segment combination. Further, EHT-SIG-B further includes indication information on CC1 and CC2, and the indication information is used to indicate a quantity of STAs that transmit data in the segment combination. Alternatively, EHT-SIG-B respectively includes first indication information and second indication information on CC1 and CC2, and the first indication information and the second indication information are used to jointly indicate a quantity of STAs that transmit data in the segment combination.

Further, the resource unit allocation subfield is shown in Table 18, and indicates some or all possible segment combinations. Optionally, the indication information may be further included. In addition, the indication information may alternatively be combined with the segment combination indication subfield, to implement a uniform indication. The entire segment indicates that an entire segment allocated to the STA is allocated to the STA as one RU.

TABLE 18

| Resource unit allocation subfield | Segment combination |
| --- | --- |
| First value | Entire segment to which a STA belongs |
| Second value | Seg 1 + Seg 2 + Seg 3 |
| Third value | Seg 1 + Seg 2 + Seg 4 |
| Fourth value | Seg 1 + Seg 3 + Seg 4 |
| Fifth value | Seg 2 + Seg 3 + Seg 4 |
| Sixth value | Seg 1 + Seg 2 + Seg 3 + Seg 4 |

Seg 1, Seg 2, Seg 3, and Seg 4 are the four different segments.

Optionally, lengths of the first value, the second value, the third value, the fourth value, the fifth value, and the sixth value are all 8 bits. In other words, the resource unit allocation subfield may be 8 bits.

It may be understood that the foregoing table enumerates all possible combinations of the segments. In actual application, only some of all the possible combinations may be used.

For example, an example of a correspondence between a value of the resource unit allocation subfield and the indicated segment combination RU is shown in Table 19.

TABLE 19

| Resource unit allocation subfield | Segment combination |
| --- | --- |
| 000 | Entire segment to which a STA belongs |
| 001 | Seg 1 + Seg 2 + Seg 3 |
| 010 | Seg 1 + Seg 2 + Seg 4 |
| 011 | Seg 1 + Seg 3 + Seg 4 |
| 100 | Seg 2 + Seg 3 + Seg 4 |
| 101 | Seg 1 + Seg 2 + Seg 3 + Seg 4 |

In the third manner of Example 2, an indication manner of the compressed mode is used, such that resource overheads can be reduced. Further, a segment combination indication method is designed in this manner.

Embodiment 2

As described in Embodiment 1, a PPDU includes EHT-SIG-A corresponding to each subblock (namely, the second field in Embodiment 1 and Embodiment 2. Alternatively, EHT-SIG-A includes the second field when the subblock includes a plurality of CCs) and EHT-SIG-B corresponding to each subblock (namely, the first field in the following Embodiment 1 and Embodiment 2. Alternatively, EHT-SIG-B includes the first field when the subblock includes a plurality of CCs). For example, the second field is EHT-SIG-A, and the first field is EHT-SIG-B. M pieces of EHT-SIG-A are in a one-to-one correspondence with M pieces of EHT-SIG-B. EHT-SIG-A includes at least one piece of the following information: a symbol quantity of EHT-SIG-B corresponding to EHT-SIG-A, an MCS of EHT- SIG-B, a compressed mode of EHT-SIG-B, a transmission bandwidth of the PPDU, a basic service set color, a guard interval and long training sequence size.

Figure 23:
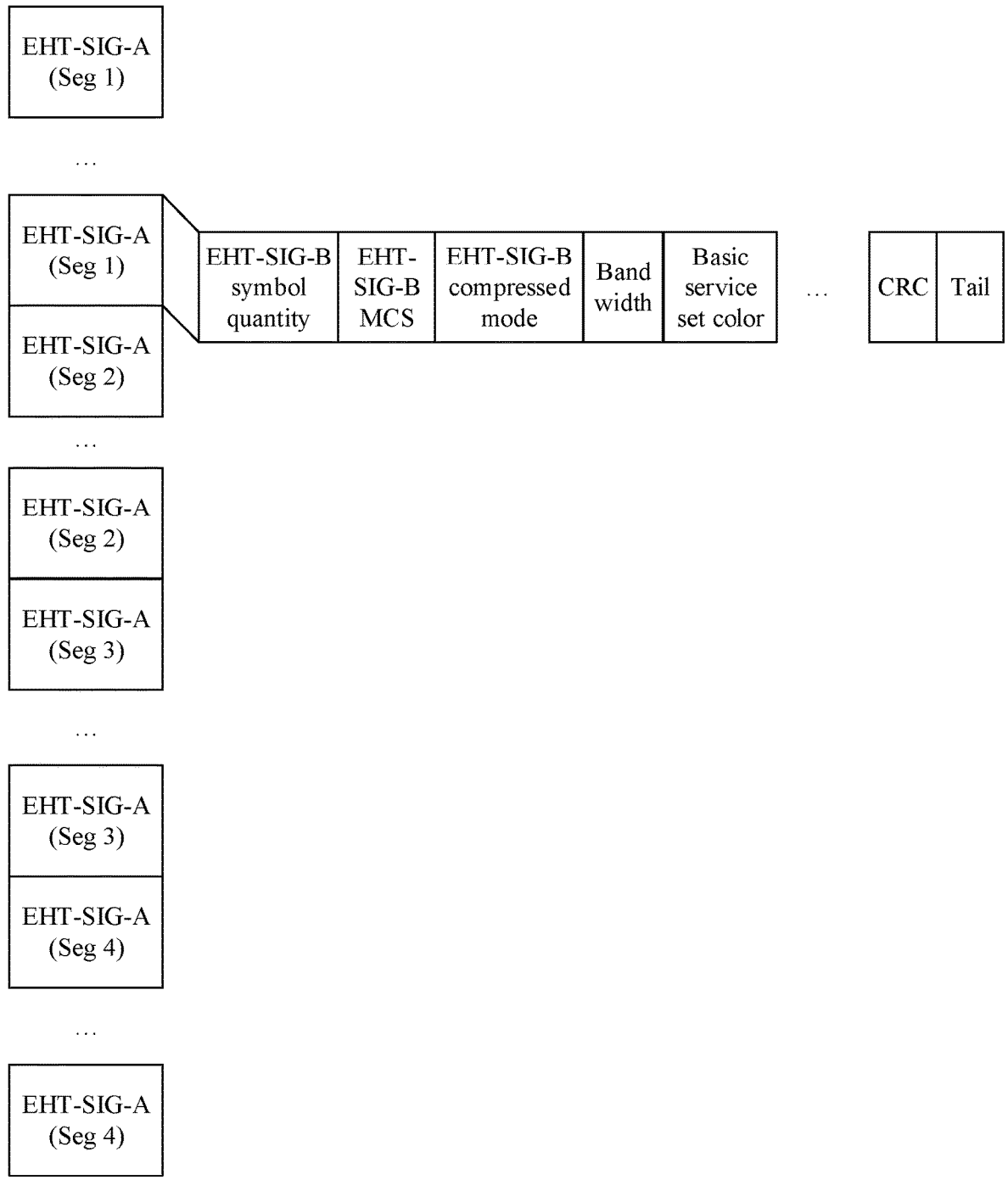
FIG. 23 is a schematic diagram of EHT-SIG-A in a segment according to an embodiment of this application.

For example, FIG. 23 is a schematic diagram of EHT-SIG-A in a segment according to an embodiment of this application. As shown in FIG. 23, the entire transmission bandwidth of the PPDU is divided into M subblocks in a unit of 80 MHz or 160 MHz. An AP sends EHT-SIG-A with same or different content in all the subblocks. EHT-SIG-A of each subblock in the PPDU sent based on the plurality of subblocks may indicate different content compared with completely duplicated EHT-SIG-A in other approaches, for example.

EHT-SIG-B MCS: Different EHT-SIG-B MCSs may be set based on a quantity of pieces of information in EHT-SIG-B of each subblock and channel quality.

Basic service set color: an identifier of a basic service set in which the AP is located. Different subblocks may be considered as different basic service sets and may indicate different basic service set colors.

EHT-SIG-B compressed mode: The compressed mode is set based on whether EHT-SIG-B of each subblock is a subblock combination or a segment combination or occupies the entire subblock.

In addition, different subblocks may alternatively have a same EHT-SIG-A parameter.

EHT-SIG-B symbol quantity: alignment of all parts of EHT-SIG-B is ensured.

PPDU bandwidth: uniformly indicated as a bandwidth of the entire PPDU.

Guard interval and long training sequence size: A same value is set, to ensure alignment of guard intervals of EHT-LTF in all the subblocks and alignment of long training sequences of EHT-LTF in all the subblocks, and ensure alignment of symbol levels.

In summary, this application provides a resource unit indication method, including M pieces of EHT-SIG-A. The method in which indication and transmission are performed based on each subblock using EHT-SIG-A supports subblock-based data transmission. The method is applicable to a case in which a STA supports a maximum bandwidth but has a relatively small capability.

Embodiment 3

Figure 24:
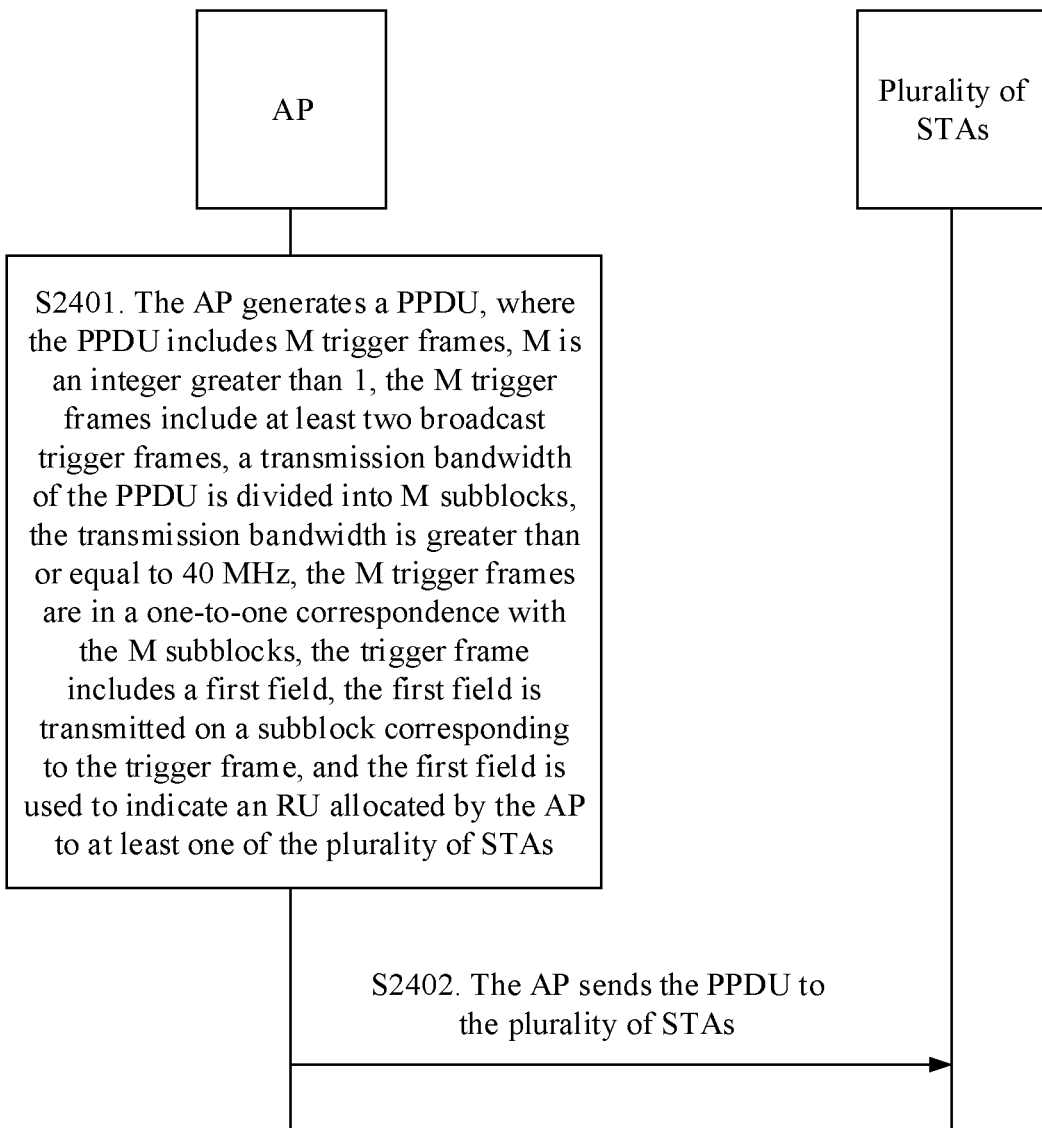
FIG. 24 is a flowchart of a resource unit indication method according to an embodiment of this application.

Embodiment 1 provides the resource unit indication method that is based on DL OFDMA and DL MU MIMO. Embodiment 3 provides a resource unit indication method that is based on a trigger frame. For example, FIG. 24 is a flowchart of a resource unit indication method according to an embodiment of this application. As shown in FIG. 24, the method includes the following steps.

Step S2401: An AP generates a PPDU, where the PPDU includes M trigger frames, M is an integer greater than 1, the M trigger frames optionally include at least two broadcast trigger frames, a transmission bandwidth of the PPDU is divided into M subblocks, the transmission bandwidth is greater than or equal to 40 MHz, the M trigger frames are in a one-to-one correspondence with the M subblocks, the trigger frame includes a first field, the first field is transmitted on a subblock corresponding to the trigger frame, and the first field is used to indicate an RU allocated by the AP to at least one of a plurality of STAs.

Step S2402: The AP sends the PPDU to the plurality of STAs.

A station that receives the PPDU may transmit uplink data based on the first field. For example, the station that receives the PPDU may determine, based on the first field, a specific RU in which the STA can send uplink data. Further, the STA may send uplink data to the AP in the corresponding RU.

Additionally, the transmission bandwidth of the PPDU may be divided into several subblocks in a subblock unit of 80 MHz. Each trigger frame is used to trigger a STA to perform uplink transmission. A resource unit allocation subfield (which may be understood as the first field in this embodiment) in each subblock separately indicates a resource unit allocation status for a STA to which the resource unit allocation subfield belongs. For example, FIG. 25 is a schematic diagram of common fields and per STA fields included in four trigger frames in a subblock unit of 80 MHz according to an embodiment of this application. As shown in FIG. 25, each trigger frame includes a common field and a per STA field. Optionally, the common field includes: uplink space time block code, AP transmit power, PPDU extension, uplink spatial multiplexing, uplink HE-SIG-A reservation, common information based on a trigger frame type, a reserved field, and the like. The per STA field includes fields such as an association identifier, a resource unit allocation subfield, an uplink coding type, uplink dual-carrier modulation, spatial flow quantity/random contention resource unit information, a received signal strength indicator, and station information based on the trigger frame type.

Further, the AP may transmit the trigger frame in the following several manners.

Manner 1: The trigger frame is transmitted using an HE or EHT MU PPDU; to be more specific, trigger frames in different subblocks are transmitted using different RUs.

Manner 2: Respective PPDUs are transmitted in different subblocks in an FDMA manner, where each PPDU carries a trigger frame of a corresponding segment.

For the resource unit allocation subfield, when an RU indicated by the resource unit allocation subfield is less than or equal to a maximum RU included in a subblock corresponding to the resource unit allocation subfield, the resource unit subfield shown in Table 2 is used to indicate a resource.

Optionally, when an RU indicated by the resource unit allocation subfield is greater than a maximum RU included in a subblock corresponding to the resource unit allocation subfield, the RU indicated by the resource unit allocation subfield is a subblock combination including a plurality of subblocks, or the RU indicated by the resource unit allocation subfield is a segment combination including all or some segments included in a plurality of subblocks.

Further, when the transmission bandwidth is 320 MHz and M=4, the RU indicated by the resource unit allocation subfield is a subblock combination (the subblock combination is also referred to as a segment combination in a division unit of 80 MHz), and one subblock includes two 80 MHz segments. Correspondingly, a correspondence between the resource unit allocation subfield and the subblock combination includes at least one of the following entries shown in Table 20.

TABLE 20

| Resource unit allocation subfield | Subblock combination RU |
| --- | --- |
| First value | Part 1 + Part 2 |
| Second value | Part 1 + Part 3 |
| Third value | Part 1 + Part 4 |
| Fourth value | Part 2 + Part 3 |

TABLE 20-continued

| Resource unit allocation subfield | Subblock combination RU |
|---|---|
| Fifth value | Part 2 + Part 4 |
| Sixth value | Part 3 + Part 4 |
| Seventh value | Part 1 + Part 2 + Part 3 |
| Eighth value | Part 1 + Part 2 + Part 4 |
| Ninth value | Part 1 + Part 3 + Part 4 |
| Tenth value | Part 2 + Part 3 + Part 4 |
| Eleventh value | Part 1 + Part 2 + Part 3 + Part 4 |

Part 1, Part 2, Part 3, and Part 4 are the four different subblocks.

Optionally, lengths of the first value, the second value, the third value, the fourth value, the fifth value, the sixth value, the seventh value, the eighth value, the ninth value, the tenth value, and the eleventh value are all 8 bits. In other words, the first field may be 8 bits.

It should be noted that the mapping relationship between the resource unit allocation subfield and the subblock combination may be changed, and is not limited to the case enumerated in this embodiment of this application. For example, the mapping relationship may alternatively be as follows: When the resource unit allocation subfield is a first value, the subblock combination is a combination of Part 1 and Part 3. When the resource unit allocation subfield is a second value, the subblock combination is a combination of Part 1 and Part 2. It may be understood that other alternative cases also fall within the protection scope of the embodiments of this application. The subblock identifiers used in the table are logical identifiers of the subblocks. Usually, a subblock identifier 1 (Part 1) indicates a first lowest frequency 80 MHz channel including a primary 20 MHz channel, a subblock identifier 2 (Part 2) indicates a second lowest frequency 80 MHz channel adjacent to Part 1, a subblock identifier 3 (Part 3) indicates a higher frequency 80 MHz channel adjacent to Part 2, and a subblock identifier 4 (Part 4) indicates a first highest frequency 80 MHz channel adjacent to Part 3. The foregoing describes a common mapping relationship between a subblock identifier and a channel. Another mapping relationship between a subblock identifier and a channel also exists. This is not limited in this application.

In addition, the foregoing table enumerates all possible combination cases of the four subblocks. In actual application, only some combination cases in the foregoing table may be included. In an example, the resource unit allocation subfield may be a combination of subblocks consecutive in frequency domain. For example, only six of the foregoing 11 combination cases may be included: Part 1+Part 2, Part 2+Part 3, Part 3+Part 4, Part 1+Part 2+Part 3, Part 2+Part 3+Part 4, and Part 1+Part 2+Part 3+Part 4.

This embodiment of this application further provides a correspondence between the resource unit allocation subfield and the subblock combination RU. An example is shown in Table 21.

TABLE 21

| Resource unit allocation subfield | Subblock combination RU | Entry quantity |
|---|---|---|
| 68 | Part 1 + Part 2 | 1 |
| 69 | Part 1 + Part 3 | 1 |
| 70 | Part 1 + Part 4 | 1 |
| 71 | Part 2 + Part 3 | 1 |
| 72 | Part 2 + Part 4 | 1 |

TABLE 21-continued

| Resource unit allocation subfield | Subblock combination RU | Entry quantity |
|---|---|---|
| 73 | Part 3 + Part 4 | 1 |
| 74 | Part 1 + Part 2 + Part 3 | 1 |
| 75 | Part 1 + Part 2 + Part 4 | 1 |
| 76 | Part 1 + Part 3 + Part 4 | 1 |
| 77 | Part 2 + Part 3 + Part 4 | 1 |
| 78 | Part 1 + Part 2 + Part 3 + Part 4 | 1 |

It may be understood that the correspondences between different values of the resource unit allocation subfield and different subblock combinations may be replaced, and are not limited to this type of correspondence provided in Table 21.

It should be noted that, it may be learned that in each subblock, only resource unit allocation in the subblock needs to be indicated, and therefore 80 MHz does not need to be indicated. Therefore, 1 bit may not be additionally transmitted, or the bit is set to a reserved bit for subsequent use.

When the transmission bandwidth is 320 MHz and M=4, in a case of the same bandwidth, trigger frame overheads in this application are reduced to one quarter compared with trigger frame overheads in other approaches. Further, the trigger frame in this application may indicate across-subblock subblock combination.

When the transmission bandwidth is 320 MHz and M=2, the RU indicated by the resource unit allocation subfield is a segment combination. Correspondingly, a correspondence between the resource unit allocation subfield and the segment combination includes at least one of the following entries shown in Table 22.

TABLE 22

| Resource unit allocation subfield | Segment combination RU |
|---|---|
| First value | Seg 1 + Seg 2 + Seg 3 |
| Second value | Seg 1 + Seg 2 + Seg 4 |
| Third value | Seg 1 + Seg 3 + Seg 4 |
| Fourth value | Seg 2 + Seg 3 + Seg 4 |
| Fifth value | Seg 1 + Seg 2 + Seg 3 + Seg 4 |

Seg 1, Seg 2, Seg 3, and Seg 4 are the four different segments.

Optionally, lengths of the first value, the second value, the third value, the fourth value, and the fifth value are all 8 bits. In other words, the resource unit allocation subfield may be 8 bits.

It should be noted that the mapping relationship between the resource unit allocation subfield and the segment combination may be changed, and is not limited to the case enumerated in this embodiment of this application. For example, the mapping relationship may alternatively be as follows: When the resource unit allocation subfield is a first value, the segment combination is a combination of Seg 1, Seg 2, and Seg 4. When the resource unit allocation subfield is a second value, the segment combination is a combination of Seg 1, Seg 2, and Seg 3. It may be understood that other alternative cases also fall within the protection scope of the embodiments of this application.

In addition, the foregoing table enumerates some or all possible combination cases of the four segments. In actual application, only some combination cases in the foregoing table may be included. In an example, the resource unit allocation subfield may indicate a combination of segments consecutive in frequency domain. For example, only two of the foregoing five combination cases may be included: Seg 1+Seg 2+Seg 3 and Seg 1+Seg 2+Seg 3+Seg 4.

This embodiment of this application further provides a correspondence between the resource unit allocation subfield and the segment combination RU. An example is shown in Table 23.

TABLE 23

| Resource unit allocation subfield | Segment combination RU | Entry quantity |
|---|---|---|
| 69 | Seg 1 + Seg 2 + Seg 3 | 1 |
| 70 | Seg 1 + Seg 2 + Seg 4 | 1 |
| 71 | Seg 1 + Seg 3 + Seg 4 | 1 |
| 72 | Seg 2 + Seg 3 + Seg 4 | 1 |
| 73 | Seg 1 + Seg 2 + Seg 3 + Seg 4 | 1 |

When the transmission bandwidth is divided into M subblocks in a unit of 160 MHz, and the RU indicated by the first field is less than or equal to a 996-tone RU, the trigger frame further includes a second field; and when the second field is a first value, the RU indicated by the first field belongs to primary 80 MHz in the subblock corresponding to the trigger frame, or when the second field is a second value, the second value is used to indicate that the RU belongs to secondary 80 MHz in the subblock corresponding to the trigger frame; or when the second field is a first value, the first value is used to indicate that the RU belongs to a low frequency 80 MHz in the subblock corresponding to the trigger frame, or when the second field is a second value, the second value is used to indicate that the RU belongs to a high frequency 80 MHz in the subblock corresponding to the trigger frame.

When the transmission bandwidth is 320 MHz and M=2, in a case of the same bandwidth, trigger frame overheads in this application are reduced to one half compared with trigger frame overheads in other approaches. Further, the trigger frame in this application may indicate a cross-subblock subblock combination.

Optionally, when the AP indicates an RU for a STA in a subblock to which the STA belongs, the RU indicated by the AP is not limited to the subblock to which the STA belongs, but may be further extended to the entire bandwidth. Based on Table 14, 2 bits are further introduced to indicate 80 MHz of 320 MHz.

For example, when the transmission bandwidth is 320 MHz, the trigger frame further includes a third field, and the third field may include 2 bits.

When the third field is a first value and the RU is less than or equal to a 996-tone RU, the first value is used to indicate that the RU belongs to a first lowest frequency 80 MHz in the transmission bandwidth, or when the third field is a second value and the RU is less than or equal to a 996-tone RU, the second value is used to indicate that the RU belongs to a second lowest frequency 80 MHz in the transmission bandwidth, or when the third field is a third value and the RU is less than or equal to a 996-tone RU, the third value is used to indicate that the RU belongs to a second highest frequency 80 MHz in the transmission bandwidth, or when the third field is a fourth value and the RU is less than or equal to a 996-tone RU, the fourth value is used to indicate that the RU belongs to a first highest frequency 80 MHz in the transmission bandwidth; or when the third field is a first value and the RU is less than or equal to a 996-tone RU, the first value is used to indicate that the RU belongs to primary 80 MHz in the transmission bandwidth, or when the third field is a second value and the RU is less than or equal to a 996-tone RU, the second value is used to indicate that the RU belongs to first secondary 80 MHz in the transmission bandwidth, or when the third field is a third value and the RU is less than or equal to a 996-tone RU, the third value is used to indicate that the RU belongs to second secondary 80 MHz in the transmission bandwidth, or when the third field is a fourth value and the RU is less than or equal to a 996-tone RU, the fourth value is used to indicate that the RU belongs to third secondary 80 MHz in the transmission bandwidth.

For example, a meaning expressed by the third field is shown in Table 24.

TABLE 24

| Third field | Option 1 | Option 2 |
|---|---|---|
| First value | First lowest frequency 80 MHz channel ($1^{st}$ Lowest Frequency 80 MHz) | Primary 80 MHz channel (Temporary) primary 80 MHz channel |
| Second value | Second lowest frequency 80 MHz channel ($2^{nd}$ Lowest Frequency 80 MHz) | First secondary 80 MHz channel (Temporary) secondary 80 MHz channel |
| Third value | Second highest frequency 80 MHz channel ($2^{nd}$ Highest Frequency 80 MHz) | Second secondary 80 MHz channel (Temporary) third 80 MHz channel |
| Fourth value | First highest frequency 80 MHz channel ($1^{st}$ Highest Frequency 80 MHz) | Third secondary 80 MHz channel (Temporary) fourth 80 MHz channel |

Optionally, lengths of the first value, the second value, the third value, and the fourth value are all 2 bits. Table 25 shows an example of a meaning expressed by the third field.

TABLE 25

| Third field | Option 1 | Option 2 |
|---|---|---|
| 00 | First lowest frequency 80 MHz channel ($1^{st}$ Lowest Frequency 80 MHz) | Primary 80 MHz channel (Temporary) primary 80 MHz channel |
| 01 | Second lowest frequency 80 MHz channel ($2^{nd}$ Lowest Frequency 80 MHz) | First secondary 80 MHz channel (Temporary) secondary 80 MHz channel |
| 10 | Second highest frequency 80 MHz channel ($2^{nd}$ Higher Frequency 80 MHz) | Second secondary 80 MHz channel (Temporary) third 80 MHz channel |
| 11 | First highest frequency 80 MHz channel ($1^{st}$ Higher Frequency 80 MHz) | Third secondary 80 MHz channel (Temporary) fourth 80 MHz channel |

Further, after receiving a trigger frame in a corresponding subblock, a STA may determine, based on a third field, a specific 80 MHz channel on which the trigger frame is carried, determine, based on a first field carried in the trigger frame, an RU allocated by the AP to the STA, and transmit uplink data in the RU.

Based on this, on a basis that overheads in this application are reduced compared with overheads in other approaches, only 1 bit is added for each station, to implement a more flexible resource unit indication method.

Embodiment 4

Figure 26:
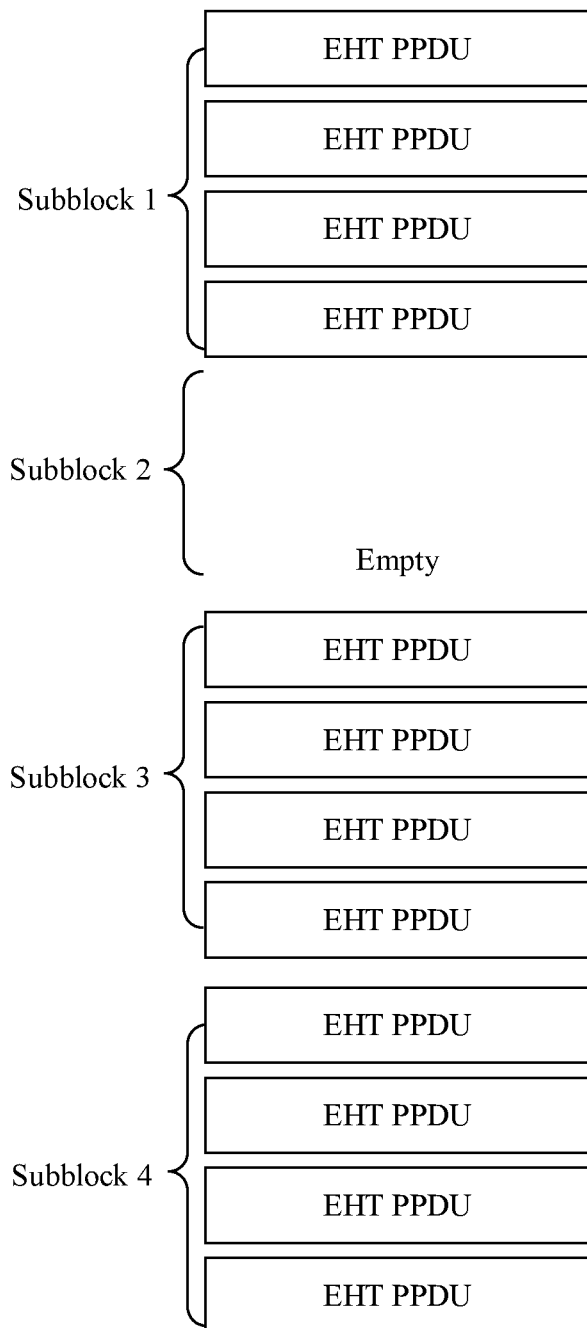
FIG. 26 is a schematic diagram of transmitting an EHT PPDU in some subblocks according to an embodiment of this application.

Based on Embodiment 1, Embodiment 2, or Embodiment 3, the subblocks provided in this application may not all have data transmission; in other words, the AP may not transmit any data in some subblocks. For example, FIG. 26 is a schematic diagram of transmitting an EHT PPDU in some subblocks according to an embodiment of this application. As shown in FIG. 26, no data is transmitted in a subblock 2. This case is applicable to a case in which interference exists in some segments. Based on this, a channel resource can be fully used.

Figure 27:
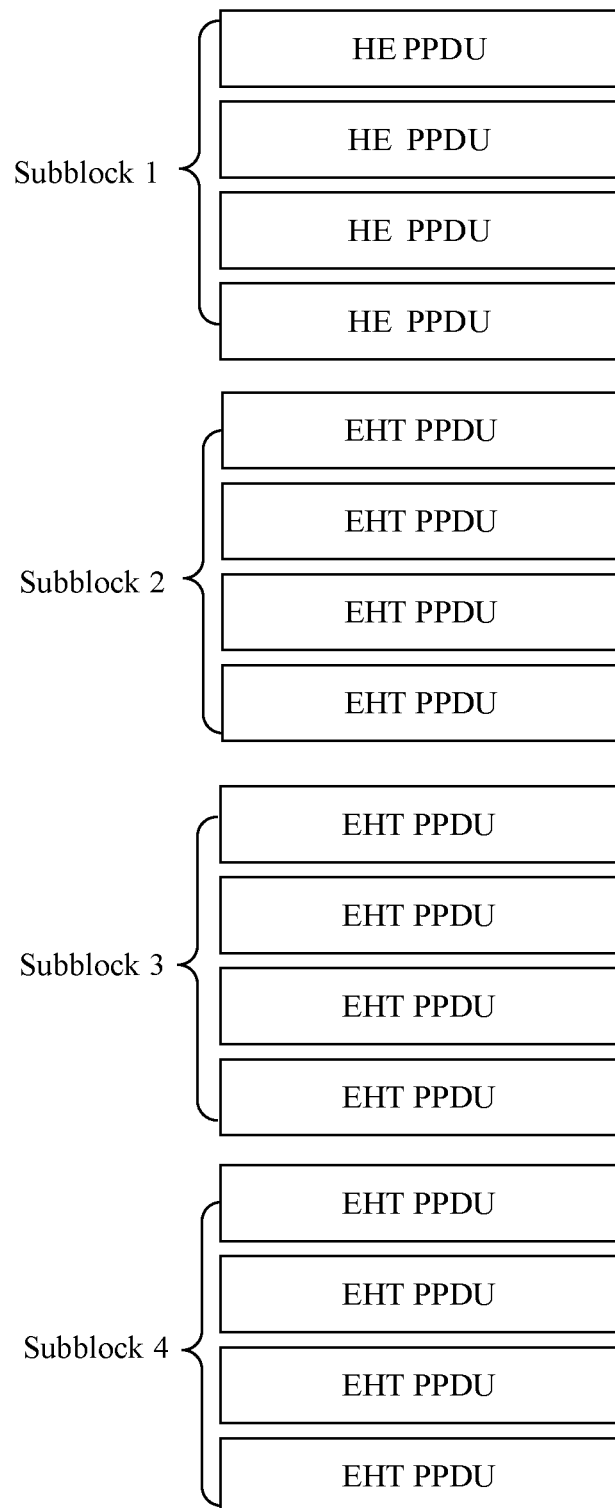
FIG. 27 is a schematic diagram of transmitting a non-EHT PPDU in some subblocks according to an embodiment of this application.

In another example, non-EHT data is transmitted in some subblocks. For example, FIG. 27 is a schematic diagram of transmitting a non-EHT PPDU in some subblocks according to an embodiment of this application. As shown in FIG. 27, for example, the AP transmits an HE PPDU in a subblock in which primary 20 MHz is located, and transmits an EHT PPDU in the other subblocks.

In summary, data transmission flexibility can be implemented using the two examples in this application.

Embodiment 5

Figure 28:
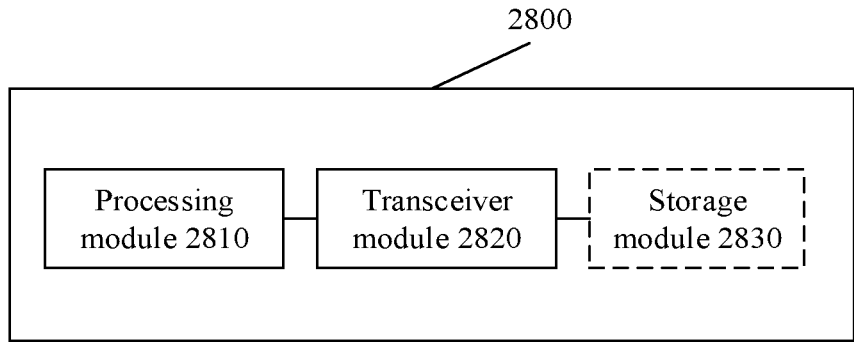
FIG. 28 is a schematic block diagram of an apparatus 2800 on an access point side according to an embodiment of this application.

FIG. 28 is a schematic block diagram of an apparatus 2800 on an access point side according to an embodiment of this application. In an embodiment, the apparatus 2800 shown in FIG. 28 may correspond to the access point apparatus in the foregoing method embodiments, and may have the functions of the access point in the methods. Optionally, the apparatus 2800 in this embodiment of this application may be an access point, or may be a chip in the access point. The apparatus 2800 may include a processing module 2810 and a transceiver module 2820. Optionally, the apparatus 2800 may further include a storage module 2830.

For example, the processing module 2810 may be configured to generate a signal or data information sent in the foregoing method embodiments, for example, configured to perform steps S1201 and S2401.

The transceiver module 2820 is configured to support communication between the AP and a station and another node. It may be understood that the transceiver module may include a receiving module and a sending module. The sending module may be configured to perform steps S1202 and S2402 in the foregoing method embodiments.

It should be understood that the apparatus 2800 according to this embodiment of this application may correspond to the access point in the methods in the foregoing embodiments, and the foregoing and other management operations and/or functions of the modules in the apparatus 2800 are respectively used to implement corresponding steps of the foregoing methods. For brevity, details are not described herein.

Alternatively, the apparatus 2800 may be configured as a general-purpose processing system, for example, commonly known as a chip. The processing module 2810 may include one or more processors that provide a processing function. The transceiver module 2820 may be, for example, an input/output interface, a pin, or a circuit. The input/output interface may be configured to be responsible for information exchange between the chip system and the outside. For example, the input/output interface may output the signal or data information generated by the processing module 2810 to another module outside the chip for processing. The processing module may execute a computer-executable instruction stored in the storage module, to implement the functions of the access point in the foregoing method embodiments. In an example, the storage module 2830 optionally included in the apparatus 2800 may be a storage unit inside the chip, for example, a register or a cache, or the storage module 2830 may be a storage unit outside the chip, for example, a read-only memory (ROM), another type of static storage device that can store static information and instructions, or a random access memory (RAM).

Figure 29:
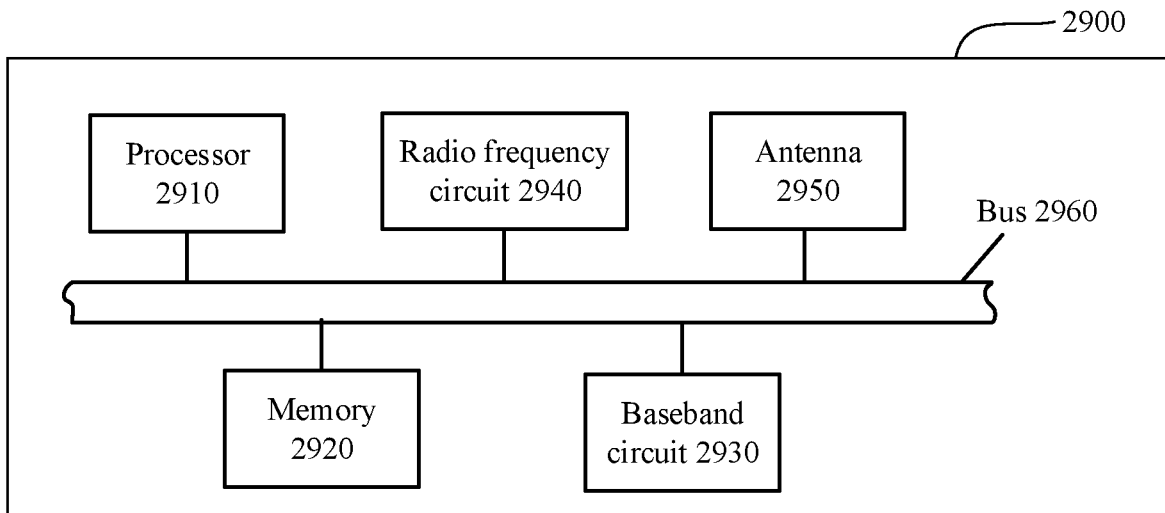
FIG. 29 is a schematic block diagram of another communications apparatus 2900 on an access point side according to an embodiment of this application.

In another example, FIG. 29 is a schematic block diagram of another communications apparatus 2900 on an access point side according to an embodiment of this application. The apparatus 2900 in this embodiment of this application may be the access point in the foregoing method embodiments, and the apparatus 2900 may be configured to implement some or all of the functions of the access point in the foregoing method embodiments. The apparatus 2900 may include a processor 2910, a baseband circuit 2930, a radio frequency circuit 2940, and an antenna 2950. Optionally, the apparatus 2900 may further include a memory 2920. The components of the apparatus 2900 are coupled together using a bus 2960. In addition to a data bus, the bus system 2960 includes a power bus, a control bus, and a status signal bus. However, for clear description, various types of buses in the figure are marked as the bus system 2960.

The processor 2910 may be configured to control the access point, and is configured to perform the processing performed by the access point in the foregoing embodiments. The processor 2910 may perform the processing process related to the access point in the foregoing method embodiments and/or other processes of the technology described in this application, and may further run an operating system. The processor 2910 is responsible for managing the bus, and may execute a program or an instruction stored in the memory.

The baseband circuit 2930, the radio frequency circuit 2940, and the antenna 2950 may be configured to support information receiving and sending between the access point and a station, to support wireless communication between the access point and another node. For example, a PPDU may be processed by the processor 2910, baseband processing such as protocol-based encapsulation and coding may be performed by the baseband circuit 2930, and radio frequency processing such as analog conversion, filtering, amplification, and up-conversion may be further performed by the radio frequency circuit 2940, and then sent by the antenna 2950 to the station. It may be understood that the baseband circuit 2930, the radio frequency circuit 2940, and the antenna 2950 may be further configured to support communication between the access point and another network entity, for example, communication between the access point and a network element on a core network side.

The memory 2920 may be configured to store program code and data of the access point, and the memory 2920 may be the storage module 2830 in FIG. 28. As shown in FIG. 29, the memory 2920 is separated from the processor 2910. However, a person skilled in the art understands that the memory 2920 or any part of the memory 2920 may be located outside the apparatus 2900. For example, the memory 2920 may include a transmission line and/or a computer product separated from a wireless node. These media can be accessed by the processor 2910 using the bus interface 2960. Alternatively, the memory 2920 or any part of the memory 2920 may be integrated into the processor 2910, for example, may be a cache and/or a general-purpose register.

In an example, in FIG. 28, the transceiver 2820 may include the baseband circuit 2930, the radio frequency circuit 2940, and the antenna 2950, and the processing module 2810 may be the processor 2910. In another example, in FIG. 28, the transceiver 2820 may include only the antenna in FIG. 29, and the processing module 2810 may include the processor 2910, and further include the radio frequency circuit 2940 and the baseband circuit 2930. In still another example, in FIG. 28, the processing module 2810 may include the processor 2910 and the baseband circuit 2930, and the transceiver 2820 may include the radio frequency circuit 2940 and the antenna 2950.

It may be understood that FIG. 29 shows only a simplified design of the access point. For example, in actual application, the access point may include any quantity of transmitters, receivers, processors, memories, or the like, and all access points that can implement the present disclosure fall within the protection scope of the present disclosure.

An embodiment of this application further provides a computer-readable storage medium. The computer-readable storage medium stores an instruction, and the instruction may be executed by one or more processors in a processing circuit. When the computer-readable storage medium runs on a computer, the computer is enabled to perform the methods in the foregoing embodiments.

Embodiment 6

Figure 30:
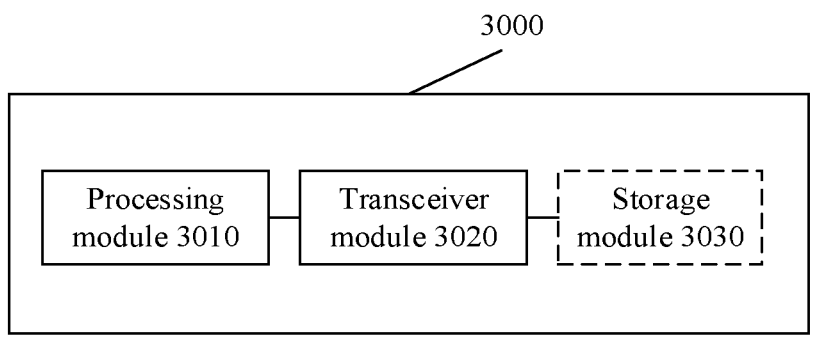
FIG. 30 is a schematic block diagram of an apparatus 3000 on a station side according to an embodiment of this application.

FIG. 30 is a schematic block diagram of an apparatus 3000 on a station side according to an embodiment of this application. In an embodiment, the apparatus 3000 shown in FIG. 30 may correspond to the station apparatus in the foregoing method embodiments, and may have the functions of the station in the methods. Optionally, the apparatus 3000 in this embodiment of this application may be a station, or may be a chip in the station. The apparatus 3000 may include a processing module 3010 and a transceiver module 3020. Optionally, the apparatus 3000 may further include a storage module 3030.

For example, the transceiver module 3020 is configured to support communication between the STA and an AP and another node. It may be understood that the transceiver module may include a receiving module and a sending module. The receiving module may be configured to receive the PPDU sent in step S1202 or S2402 in the foregoing method embodiment.

The processing module 3010 may be configured to parse, based on signal information such as the first field and the second field in the foregoing method embodiments, the PPDU received by the receiving module.

It should be understood that the apparatus 3000 according to this embodiment of this application may correspond to the station in the methods in the foregoing embodiments, and the foregoing and other management operations and/or functions of the modules in the apparatus 3000 are respectively used to implement corresponding steps of the foregoing methods. For brevity, details are not described herein.

Alternatively, the apparatus 3000 may be configured as a general-purpose processing system, for example, commonly known as a chip. The processing module 3010 may include one or more processors that provide a processing function. The transceiver module 3020 may be, for example, an input/output interface, a pin, or a circuit. The input/output interface may be configured to be responsible for information exchange between the chip system and the outside. For example, the input/output interface may output a PPDU received from another module outside the chip to the processing module 3010 inside the chip for processing. The processing module may execute a computer-executable instruction stored in the storage module, to implement the functions of the station in the foregoing method embodiments. In an example, the storage module 3030 optionally included in the apparatus 3000 may be a storage unit inside the chip, for example, a register or a cache, or the storage module 3030 may be a storage unit outside the chip, for example, a read-only memory (ROM), another type of static storage device that can store static information and instructions, or a random access memory (RAM).

Figure 31:
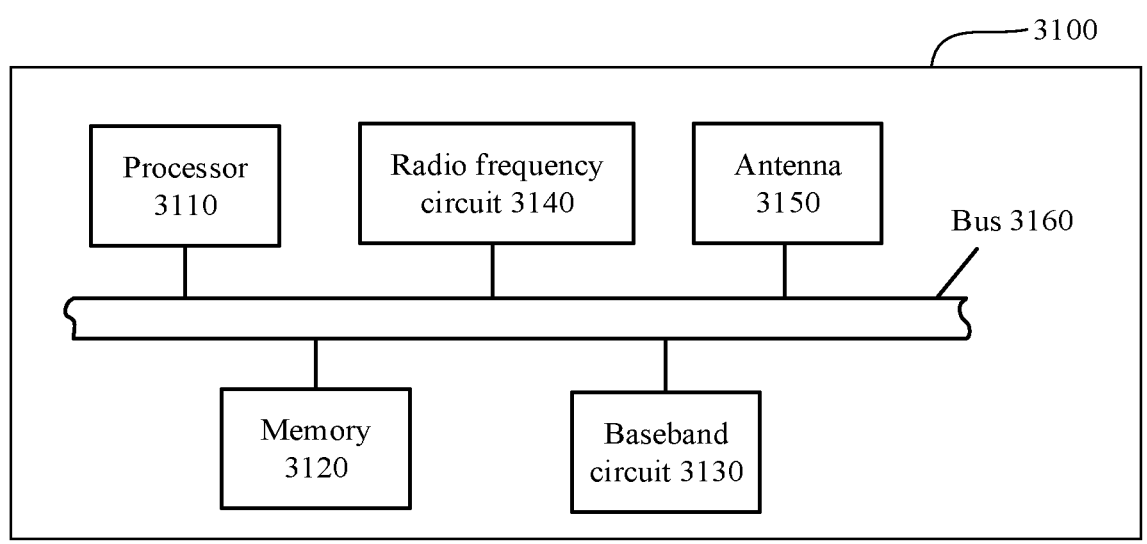
FIG. 31 is a schematic block diagram of another communications apparatus 3100 on a station side according to an embodiment of this application.

In another example, FIG. 31 is a schematic block diagram of another communications apparatus 3100 on a station side according to an embodiment of this application. The apparatus 3100 in this embodiment of this application may be the station in the foregoing method embodiments, and the apparatus 3100 may be configured to implement some or all of the functions of the station in the foregoing method embodiments. The apparatus 3100 may include a processor 3110, a baseband circuit 3130, a radio frequency circuit 3140, and an antenna 3150. Optionally, the apparatus 3100 may further include a memory 3120. The components of the apparatus 3100 are coupled together using a bus 3160. In addition to a data bus, the bus system 3160 includes a power bus, a control bus, and a status signal bus. However, for clear description, various types of buses in the figure are marked as the bus system 3160.

The processor 3110 may be configured to control the station, and is configured to perform the processing performed by the station in the foregoing embodiments. The processor 3110 may perform the processing process related to the station in the foregoing method embodiments and/or other processes of the technology described in this application, and may further run an operating system. The processor 3110 is responsible for managing the bus, and may execute a program or an instruction stored in the memory.

The baseband circuit 3130, the radio frequency circuit 3140, and the antenna 3150 may be configured to support information receiving and sending between the station and an access point, to support wireless communication between the station and another node. For example, a PPDU sent by the access point is received by the antenna 3150, processing such as filtering, amplification, down-conversion, and digitization is performed by the radio frequency circuit 3140, and baseband processing such as decoding and protocol-based data decapsulation is performed by the baseband circuit 3130, and then processing is performed by the processor 3110 to restore service data and signal information sent by the station. It may be understood that the baseband circuit 3130, the radio frequency circuit 3140, and the antenna 3150 may be further configured to support communication between the station and another network entity.

The memory 3120 may be configured to store program code and data of the station, and the memory 3120 may be the storage module 3030 in FIG. 30. As shown in FIG. 31, the memory 3120 is separated from the processor 3110. However, a person skilled in the art understands that the memory 3120 or any part of the memory 3120 may be located outside the apparatus 3100. For example, the memory 3120 may include a transmission line and/or a computer product separated from a wireless node. These media can be accessed by the processor 3110 using the bus interface 3160. Alternatively, the memory 3120 or any part of the memory 3120 may be integrated into the processor 3110, for example, may be a cache and/or a general-purpose register.

In an example, in FIG. 30, the transceiver 3020 may include the baseband circuit 3130, the radio frequency circuit 3140, and the antenna 3150, and the processing module 3010 may be the processor 3110. In another example, in FIG. 30, the transceiver 3020 may include only the antenna in FIG. 31, and the processing module 3010 may include the processor 3110, and further include the radio frequency circuit 3140 and the baseband circuit 3130. In still another example, in FIG. 30, the processing module 3010 may include the processor 3110 and the baseband circuit 3130, and the transceiver 3020 may include the radio frequency circuit 3140 and the antenna 3150.

It may be understood that FIG. 31 shows only a simplified design of the station. For example, in actual application, the station may include any quantity of transmitters, receivers, processors, memories, or the like, and all stations that can implement the present disclosure fall within the protection scope of the present disclosure.

An embodiment of this application further provides a computer-readable storage medium. The computer-readable storage medium stores an instruction, and the instruction may be executed by one or more processors in a processing circuit. When the computer-readable storage medium runs on a computer, the computer is enabled to perform the methods in the foregoing embodiments.

An embodiment of this application further provides a chip system. The chip system includes a processor, configured to support an access point in implementing the functions in the foregoing embodiments, for example, generating or processing data and/or information in the foregoing methods.

In a possible design, the chip system may further include a memory. The memory is configured to store a program instruction and data that are necessary for the access point. The chip system may include a chip, or may include a chip and another discrete device.

An embodiment of this application further provides another chip system. The chip system includes a processor, configured to support a station in implementing the functions in the foregoing embodiments, for example, generating or processing data and/or information in the foregoing methods.

In a possible design, the chip system may further include a memory. The memory is configured to store a program instruction and data that are necessary for the access point. The chip system may include a chip, or may include a chip and another discrete device.

In a possible design, the chip system may further include a memory. The memory is configured to store a program instruction and data that are necessary for the station. The chip system may include a chip, or may include a chip and another discrete device.

An embodiment of this application further provides a computer program product including an instruction. When the computer program product runs on a computer, the computer is enabled to perform the method and function related to the AP in any of the foregoing embodiments.

An embodiment of this application further provides a computer program product including an instruction. When the computer program product runs on a computer, the computer is enabled to perform the method and function related to the STA in any of the foregoing embodiments.

What is claimed is:

1. A resource unit indication method, comprising:
    sending, by an access point (AP) and to a plurality of stations (STAs), a physical protocol data unit (PPDU) that comprises M first fields and that has a first transmission bandwidth that is greater than 80 megahertz (MHz) and that is divided into M subblocks that are in a one-to-one correspondence with the M subblocks,
    wherein M is an integer greater than 1,
    wherein a second transmission bandwidth of each subblock of the M subblocks is greater than or equal to 80 MHz, and
    wherein a first field of the M first fields is transmitted on one corresponding subblock of the M subblocks and indicates a resource unit (RU) allocated by the AP to at least one of the plurality of STAs.

2. The resource unit indication method according to claim 1, wherein when the RU is greater than a maximum RU in the subblock corresponding to the first field, the RU is one of a subblock combination comprising a plurality of subblocks or a segment combination comprising all or some segments in the plurality of subblocks.

3. The resource unit indication method according to claim 1, wherein the PPDU further includes M second fields, and wherein a second field of the M second fields includes at least one of a basic service set color, a symbol quantity of the first field corresponding to the second field, a modulation and coding scheme (MCS) of the first field corresponding to the second field, a compressed mode of the first field corresponding to the second field, or the first transmission bandwidth.

4. The resource unit indication method according to claim 3, wherein at least one of the following two pieces of information in the second field corresponding to each subblock of the M subblocks is the same: the symbol quantity of the first field corresponding to the second field or the first transmission bandwidth.

5. The resource unit indication method according to claim 3, wherein the MCS of the first field corresponding to the second field is different in the second fields corresponding to at least two subblocks of the M subblocks.

6. The method according to claim 1, wherein the PPDU further includes a guard interval and long training sequence size parameters corresponding to the M subblocks, and wherein the guard interval and long training sequence size parameters indicated in each second field of the M subblocks are the same.

7. The resource unit indication method according to claim 4, wherein the second field in different subblocks of the M subblocks indicates different content.

8. A resource unit indication apparatus, wherein the resource unit indication apparatus is an access point (AP) comprising:
    a processor configured to generate a physical protocol data unit (PPDU) that comprises M first fields and that has a first transmission bandwidth that is greater than 80 megahertz (MHz) and that is divided into M subblocks that are in a one-to-one correspondence with the M first fields, wherein M is an integer greater than 1, and wherein a second transmission bandwidth of each subblock of the M subblocks is greater than or equal to 80 MHz; and
    a transceiver coupled to the processor and configured to send the PPDU to a plurality of stations (STAs),
    wherein a first field of the M first fields is transmitted on one corresponding subblock of the M subblocks and indicates a resource unit (RU) allocated by the AP to at least one of the plurality of STAs.

9. The resource unit indication apparatus according to claim 8, wherein when the RU is greater than a maximum RU in the subblock corresponding to the first field, the RU is one of a subblock combination comprising a plurality of subblocks or a segment combination comprising all or some segments in the plurality of subblocks.

10. The resource unit indication apparatus according to claim 8, wherein the PPDU further includes M second fields, and wherein a second field of the M second fields includes at least one of: a basic service set color, a symbol quantity of the first field corresponding to the second field, a modulation and coding scheme (MCS) of the first field corresponding to the second field, a compressed mode of the first field corresponding to the second field, or the first transmission bandwidth.

11. The resource unit indication apparatus according to claim 10, wherein at least one of the following two pieces of information in the second field corresponding to each subblock of the M subblocks is the same: the symbol quantity of the first field corresponding to the second field and or the first transmission bandwidth of the PPDU.

12. The resource unit indication apparatus according to claim 10, wherein the MCS of the first field corresponding to the second field is different in the second fields corresponding to at least two subblocks of the M subblocks.

13. The resource unit indication apparatus according to claim 8, wherein the PPDU further includes a guard interval and long training sequence size parameters corresponding to the M subblocks, and the guard interval and long training sequence size parameters indicated in each second field of the M subblocks are the same.

14. The resource unit indication apparatus according to claim 8,
wherein the first bandwidth is 320 MHz and is divided into four subblocks,
wherein each subblock of the four subblocks comprises four channels that comprise a first channel, a second channel, a third channel, and a fourth channel,
wherein a first content channel (CC1) and a second content channel (CC2) are transmitted on the four channels,
wherein in each subblock of the four subblocks, the CC1 is transmitted on the first channel and third channel and the CC2 is transmitted on the second channel and fourth channel,
wherein the CC1 of one subblock of the four subblocks is different from the CC1 of another subblock of the four subblocks, and
wherein the CC2 of one subblock of the four subblocks is different from the CC2 of another subblock of the four subblocks.

15. The resource unit indication apparatus according to claim 14, wherein the PPDU comprises a first 242-tone RU to a sixteenth 242-tone RU, wherein in a first subblock of the four subblocks, the CC1 carries per STA information of a STA allocated within ranges of the first 242-tone RU and a third 242-tone RU, and wherein in the first subblock, the CC2 carries per STA information of a STA allocated within ranges of a second 242-tone RU and a fourth 242-tone RU.

16. The resource unit indication apparatus according to claim 14, wherein the PPDU comprises a first 242-tone RU to a sixteenth 242-tone RU, wherein in a second subblock of the four subblocks, the CC1 carries per STA information of a STA allocated within ranges of a fifth 242-tone RU and a seventh 242-tone RU, and wherein in the second subblock, a CC2 carries per STA information of a STA allocated within ranges of a sixth 242-tone RU and an eighth 242-tone RU.

17. The resource unit indication apparatus according to claim 14, wherein the PPDU comprises a first 242-tone RU to a sixteenth 242-tone RU, wherein in a third subblock of the four subblocks, the CC1 carries per STA information of a STA allocated within ranges of a ninth 242-tone RU and an eleventh 242-tone RU, and wherein in the third subblock, the CC2 carries per STA information of a STA allocated within ranges of a tenth 242-tone RU and a twelfth 242-tone RU.

18. The resource unit indication apparatus according to claim 14, wherein the PPDU comprises a first 242-tone RU to a sixteenth 242-tone RU, wherein in a fourth subblock of the four subblocks, the CC1 carries per STA information of a STA allocated within ranges of a thirteenth 242-tone RU and a fifteenth 242-tone RU, and wherein in the fourth subblock, the CC2 carries per STA information of a STA allocated within ranges of a fourteenth 242-tone RU and the sixteenth 242-tone RU.

19. The resource unit indication apparatus according to claim 14, wherein in each subblock of the four subblocks, an RU allocation subfield of the first field indicates a quantity of STAs that transmit data on a subblock combination RU and indicates the subblock combination RU.

20. A chip system configured to support an access point (AP) and comprising:
a storage device configured to store instructions; and
a processor coupled to the storage device and configured to execute the instructions to cause an access point to be configured to:
generate a physical protocol data unit (PPDU) that comprises M first fields and that has a first transmission bandwidth that is greater than 80 megahertz (MHz) and that is divided into M subblocks that are in a one-to-one correspondence with the M first fields, wherein M is an integer greater than 1, and wherein a second transmission bandwidth of each subblock of the M subblocks is greater than or equal to 80 MHz; and
send the PPDU to a plurality of stations (STAs), wherein a first field of the M first fields is transmitted on one corresponding subblock of the M subblocks and indicates a resource unit (RU) allocated by the AP to at least one of the plurality of STAs.

* * * * *